United States Patent
Terry

(10) Patent No.: US 12,066,999 B1
(45) Date of Patent: Aug. 20, 2024

(54) LOCK-FREE TIMESTAMP ORDERING FOR DISTRIBUTED TRANSACTIONS

(71) Applicant: Amazon Technologies, Inc., Seattle, WA (US)

(72) Inventor: Douglas Brian Terry, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 17/710,567

(22) Filed: Mar. 31, 2022

(51) Int. Cl.
G06F 16/23 (2019.01)

(52) U.S. Cl.
CPC ...... G06F 16/2379 (2019.01); G06F 16/2322 (2019.01); G06F 16/2343 (2019.01)

(58) Field of Classification Search
CPC . G06F 16/2379; G06F 16/2322; G06F 16/234
See application file for complete search history.

(56) References Cited

U.S. PATENT DOCUMENTS

| | | | |
|---|---|---|---|
| 9,208,191 B2 | 12/2015 | Schreter | |
| 9,619,278 B2 | 4/2017 | Vermeulen | |
| 9,679,003 B2 | 6/2017 | Bhattacharjee et al. | |
| 9,928,264 B2 | 3/2018 | Lomet et al. | |
| 9,946,745 B2 | 4/2018 | Junqueira et al. | |
| 10,552,402 B2 | 2/2020 | Eluri et al. | |
| 10,983,981 B1* | 4/2021 | Sharma | G06F 16/2365 |
| 2006/0219772 A1* | 10/2006 | Bernstein | G06F 16/2322 |
| | | | 235/379 |
| 2011/0153566 A1* | 6/2011 | Larson | G06F 16/2329 |
| | | | 707/638 |
| 2013/0110883 A1* | 5/2013 | Junqueira | G06F 16/2336 |
| | | | 707/E17.005 |
| 2015/0193493 A1* | 7/2015 | Junqueira | G06F 16/2322 |
| | | | 707/703 |

(Continued)

FOREIGN PATENT DOCUMENTS

| | | | | |
|---|---|---|---|---|
| AU | 2016262719 A1 * | 7/2017 | ......... | G06F 16/2315 |
| CN | 110196760 A * | 9/2019 | ....... | G06F 17/30283 |
| WO | WO-2021087499 A1 * | 5/2021 | ......... | G06F 16/2308 |

OTHER PUBLICATIONS

Fernandes, Sérgio Miguel, and Joao Cachopo. "Lock-free and scalable multi-version software transactional memory." ACM SIGPLAN Notices 46.8 (2011): 179-188. (Year: 2011).*

(Continued)

*Primary Examiner* — Dennis Truong
(74) *Attorney, Agent, or Firm* — S. Scott Foster; Kowert, Hood, Munyon, Rankin & Goetzel, P.C.

(57) ABSTRACT

At a lock-less data management service, a multi-phase commit of a transaction is performed. The multi-phase commit includes a read set validation phase (in which a first set of timestamp-based conditions is used to determine whether the transaction has a read-write conflict), a pre-commit timestamps update phase (in which respective pre-commit timestamps associated with data items of the transaction's write set are set to a proposed commit time after verifying that the proposed commit time satisfies a second set of timestamp-based conditions), and a write initialization phase (in which respective new versions of individual data items of the write set are stored, without storing data item values indicated in the write set).

20 Claims, 12 Drawing Sheets

(56) References Cited

U.S. PATENT DOCUMENTS

| | | | |
|---|---|---|---|
| 2016/0110403 A1* | 4/2016 | Lomet | G06F 16/2255 |
| | | | 707/695 |
| 2016/0147811 A1* | 5/2016 | Eluri | G06F 16/2228 |
| | | | 707/694 |
| 2016/0371356 A1* | 12/2016 | Lee | G06F 16/273 |
| 2017/0177697 A1* | 6/2017 | Lee | G06F 1/14 |
| 2017/0177698 A1* | 6/2017 | Lee | G06F 16/2315 |
| 2017/0220617 A1* | 8/2017 | Bortnikov | G06F 16/2329 |
| 2018/0322158 A1 | 11/2018 | Zhang et al. | |
| 2023/0021150 A1* | 1/2023 | VanBenschoten | G06F 16/275 |

OTHER PUBLICATIONS

D. Gómez Ferro, F. Junqueira, I. Kelly, B. Reed and M. Yabandeh, "Omid: Lock-free transactional support for distributed data stores," 2014 IEEE 30th International Conference on Data Engineering, Chicago, IL, USA, 2014, pp. 676-687, doi: 10.1109/ICDE.2014.6816691 (Year: 2014).*

* cited by examiner

Example 330

| Key | Value | Commit timestamp |
|---|---|---|
| x | 29 | 11/8/2021, 8:33 am |
| x | 42 | 11/8/2021, 2:48 pm |
| y | 29 | 11/8/2021, 8:33 am |
| y | 0 | 11/8/2021, 2:48 pm |
| z | 101 | 11/8/2021, 8:33 am |

Example 332

| Key | Value | Commit timestamp | Pre-commit timestamp | TxID |
|---|---|---|---|---|
| x | 29 | 11/8/2021, 8:33 am | | |
| x | 42 | 11/8/2021, 2:48 pm | | |
| y | 29 | 11/8/2021, 8:33 am | | |
| y | null | null | 11/8/2021, 2:48 pm | 17445328 |
| z | 101 | 11/8/2021, 8:33 am | | |

*FIG. 3*

LOCK-FREE TIMESTAMP ORDERING FOR DISTRIBUTED TRANSACTIONS

BACKGROUND

In some traditional data management systems, locks are acquired for each read and write operation of a transaction to ensure serializability, and the locks are released when the transaction commits. Locking reduces the ability of concurrent transactions to execute in parallel, since write locks are exclusive. Furthermore, data may be temporarily unavailable after an application or transaction coordinator crashes because the software that acquired the lock may fail to release the lock; a recovery manager may release locks after some timeout, but other transactions that want access to locked data must wait for the recovery process to complete.

These concerns about traditional locking techniques have resulted in the design of other concurrency control schemes that do not rely as heavily on locking, such as optimistic concurrency control. However, even in optimistic concurrency control, read set validation during the commit process requires the acquisition of locks. Essentially, optimistic concurrency control acquires and releases the same set of locks that would be acquired in a traditional locking scheme; the difference is that the locks are acquired during the commit process rather than as the data items are being accessed during the transaction. The same concerns regarding failures apply as in traditional locking, although the period of vulnerability is reduced. In general, any data management system which uses locking is likely to face similar problems.

BRIEF DESCRIPTION OF DRAWINGS

FIG. 3 illustrates examples of data items and some associated timestamps, according to at least some embodiments.

Figure 1:
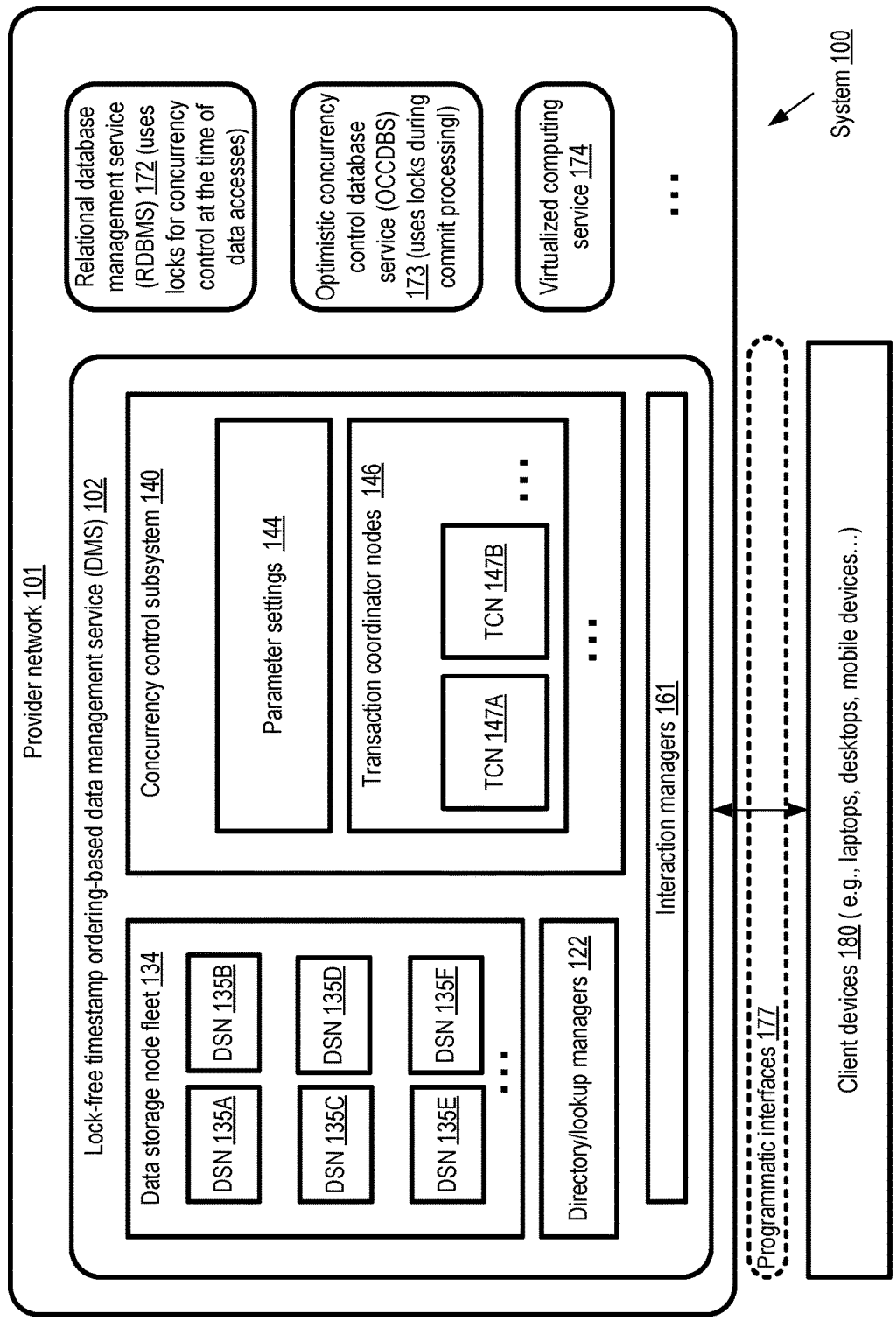
FIG. 1 illustrates an example system environment in which lock-free timestamp ordering based algorithms may be employed for concurrency control at a distributed data management service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for lock-free timestamp ordering based concurrency control for data management systems such as distributed databases. In the proposed approach, a number of different kinds of timestamps associated with data items and transactions, including commit timestamps, pre-commit timestamps, transaction start timestamps and read timestamps, are utilized in a novel way to ensure serializability without the need for acquiring or releasing locks at any stage. The techniques can be employed in decentralized distributed environments at which respective subsets of the data and metadata are stored at different nodes or devices, with local clocks at the nodes being used for providing monotonically increasing numerical values used as timestamps. The local clocks are not required to be synchronized, although excessive drift among the local clocks may in some cases lead to suboptimal behavior such as increased rates of transaction aborts or increased rates of retries during phases of commit processing. The proposed techniques can be implemented at multi-version data stores (in which multiple versions of a given data item are retained at least temporarily, with each version representing a respective write) as well as at single-version data stores (in which a given data item is overwritten in place every time a write is directed to it). In general, the proposed techniques can be utilized in a wide variety of data management services or systems, independent of the storage formats (e.g., column-based versus row-based storage), data models, or timestamp sources being used, with few restrictions other than the requirement for storing timestamps associated with data items and transactions. The timestamps applicable to data items may even be stored separately (e.g., at different nodes or devices of a distributed system) from the data items in some implementations. In at least some embodiments, the lock-free timestamp ordering based technique may be implemented at a data management service of a provider network or cloud computing environment.

As one skilled in the art will appreciate in light of this disclosure, certain embodiments may be capable of achieving various advantages, including some or all of the following: (a) improving, as a result of the elimination of locking, performance metrics such as throughputs and/or response times of various applications accessing data stores, (b) reducing work associated with cleanup operations associated with failures of components that hold locks or manage locks, (c) enhancing the overall resource utilization levels at distributed data management systems, and/or (d) simplifying the development, debugging and tuning of data management systems.

Data items (analogous, for example, to rows of database tables in a row-oriented data store) may be assumed to be identifiable using a unique key in various embodiments, and may each include some value (which could, for example in a row-oriented store, comprise a combination of sub-values representing different columns). A data item with a key K may be referred to simply as "data item K" or simply as "K" herein. In some embodiments, as mentioned above, multiple versions corresponding to respective writes of a given data item may be stored in persistent storage for at least some time intervals. The different versions of a given data item in such embodiments may each include a unique commit timestamp, indicative of the commit time of the transaction which performed the corresponding write. In at least some embodiments, a version of a given data item may at least temporarily include a pre-commit timestamp and an associated transaction identifier, indicating that the transaction (identified by the transaction identifier) includes a write directed to the data item and that the commit processing of the transaction is underway. In various embodiments, a respective read timestamp (RTS) may be stored for individual data items, indicating the most recent start time of a transaction that included a read directed to the data item. Note that at least in some implementations, an RTS may be stored per data item, and not necessarily per data item version. In some embodiments, the data items of a data management system or service may be grouped into logical collections such as tables. In one such embodiment, a respective table-level read timestamp may be stored for each such collection or table, indicating the most recent scan or SQL (Structured Query Language) style query directed to the collection/table. In embodiments in which data items are organized into tables, the key of a given data item may be required to be unique only within its parent table, so the combination of a table identifier and key may be used to uniquely identify a given data item.

Transactions may be assigned a respective unique transaction identifier (e.g., identifiers produced by a globally-unique ID (GUID) generator) in various embodiments. For each transaction, metadata including a transaction start time (a timestamp value obtained in response to a request to start a new transaction), a status (e.g., "active", "committed", or "aborted"), a commit time (if the transaction commit procedure succeeds), a read set (indicating versions of data items read, and/or groups of data items read/scanned such as tables) and a write set (indicating values to be written to data items with specified keys) may be stored in persistent storage in various embodiments.

According to various embodiments, when a request for initiating a transaction is received at a data management service (DMS), e.g., from a data item accessor application of a client of the DMS, the following operations may be performed: a new transaction identifier (TXID) may be obtained for the transaction, a timestamp used as a transaction start time (TXST) for the transaction may be obtained and stored as part of the transaction's metadata, and the TXID may be returned to the requester. In the timestamp-based approach described herein, all the reads that are part of the transaction are treated as though they occurred at the TXST. In effect, in such embodiments, in order for a transaction with transaction ID TXID1 and start time TXST1 to successfully read a data item with key K1, a version of that data item K1 whose commit timestamp is prior to TXST1 (and closest to TXST1 among all the earlier versions of the data item, if there are multiple such earlier versions) has to be accessed. If no such version exists, in various embodiments an error may be returned, even if the data item was subsequently created.

In much of the following description, multiple versions of at least some data items (those data items that happen to be written multiple times) are assumed to be stored at the DMS. In such multi-version arrangements, transactions containing reads are more likely to succeed than if no more than one version of a data item can be stored, since it is usually (depending on the maximum number of versions that can be stored per data item) possible to read an older version that corresponds to the TXST of the transaction. Note that the correctness of the techniques described herein using a multiple-version DMS is not dependent on the maximum number of versions stored; this maximum may, for example, be set to one (resulting in a single-version DMS), to five, to a hundred, to a million, or to any positive integer as desired, without impacting the correctness. The maximum number of versions stored may of course impact the total amount of storage consumed. The maximum number of versions, or more generally a technique or criterion for deletion of older versions if such deletion is desired, may be specified as a parameter by a client of the DMS in at least one embodiment. To simplify the presentation, it is assumed in much of the subsequent description that an unlimited number of versions of any given data item can be stored at a DMS.

When a request to read a data item with a specified key K is received at a DMS as part of a transaction with TXID TXID1 with start time TXST1, in various embodiments the appropriate version of the data item (the one whose commit timestamp is closest to and earlier than TXST1) is found and returned. The read timestamp of the data item K may be updated to TXST1 in such embodiments. The version that was read (e.g., the key and commit timestamp of the version that was read) may be added to the read set of the transaction. No locks may be required for performing the read.

When a request to write a value to a particular data item is received at the DMS as part of a transaction, the parameters of the write request (the key of the data item and the value to be written) may be added to the write set in various embodiments, again without acquiring a lock. The actual modification or write may be deferred until a request to commit the transaction is received at the DMS in such embodiments. A multi-phase timestamp-based commit process of the kind described below may be implemented in various embodiments in response to such a commit request; such a commit process may also not require acquisition or release of any locks.

A DMS that implements lock-free timestamp ordering based concurrency control techniques may comprise a plurality of computing devices in some embodiments, e.g., including resources of a provider network or public cloud computing environment. The computing devices may include instructions that when executed on or across one or more of the computing devices perform various operations in response to transaction start/initiation requests, read requests, write requests, transaction commit requests, requests for queries, transaction abort requests, as well as various administrative operations such as setting tuning parameters, scaling up or down resources used for data storage and/or timestamp storage, monitoring, collecting performance metrics, cleaning up after failures, and the like.

In some embodiments, such a DMS, which may be referred to as a lock-free or a lock-less DMS, may comprise one or more transaction coordinators, each implemented using some combination of hardware and software. A commit request for a particular transaction may be received at a transaction coordinator, e.g., from a client application of the DMS. The commit request may, for example, include a TXID of the transaction for which a commit is desired, which can be used to determine the transaction's other metadata including its read set and write set. The read set may indicate one or more reads that were directed in the particular transaction to respective versions of one or more data items of an item collection. The reads of the read set may have been performed without acquiring a lock in various embodiments as indicated above. The write set may indicate respective values to be written to one or more data items of the item collection (if the commit request succeeds). In at least some embodiments, the data items of the item collection may be distributed among a plurality of nodes of the DMS. Some of the nodes may be implemented at different computing devices or servers than others in one embodiment, with the different computing devices or servers reachable via network connections from at least some other devices or servers of the DMS.

In response to the commit request, in various embodiments, the transaction coordinator may initiate a multi-phase commit operation for the particular transaction. The multi-phase commit may also be performed without acquiring or releasing any locks in some embodiments. The multi-phase commit may comprise at least a read set validation phase, a pre-commit timestamps update phase, a write initialization phase and a commit finalization phase in one embodiment. In the read set validation phase, a determination may be made, using one or more timestamps including a respective pre-commit timestamp associated with data items of the read set of the particular transaction, whether the particular transaction satisfies an abort requirement due to a read-write conflict (a read-write conflict occurs if data item which was read by the transaction was updated after it was read, i.e., after the start time of the transaction). The read timestamps of the read set's data items may be updated in the read set validation phase in various embodiments, e.g., by setting them to TXST. In some cases, if the read set includes a table, a read timestamp of the table may also be updated to TXST, and this table-level read timestamp may be used in the pre-commit timestamps update phase of one or more transactions' commits procedures. If the abort requirement is satisfied, that is, if a write later that the TXST has been committed (or is in the process of being committed, as indicated by a pre-commit timestamp) at a data item of the read set, the particular transaction may be aborted in various embodiments. If the abort requirement is not satisfied, the pre-commit timestamps update phase may be initiated.

In the pre-commit timestamps update phase, respective pre-commit timestamps associated with individual data items of the write set may be set to a proposed commit time of the particular transaction after verifying that the proposed commit time satisfies one or more timestamp-based conditions in some embodiments. The conditions may be used to check that the current proposed commit time of the particular transaction is no earlier than the currently stored commit timestamps, pre-commit timestamps, and read timestamps of the write set data items. The pre-commit timestamps may in effect be used to indicate that a commit of the particular transaction is imminent but not yet guaranteed. During the pre-commit timestamps update phase, in some cases several new proposed commit times may be tried out if the timestamp-based condition checking does not succeed for one or more of the write set data items.

After the pre-commit timestamp phase, in at least some embodiments a write initialization phase of the multi-phase commit may be conducted. In this phase, respective new versions of individual data items of the write set may be stored; the new versions may contain the proposed commit time (which is the same as the updated pre-commit timestamps), and may not necessarily include the values that are to be written for the data items. A commit finalization phase may then be performed, in which the commit time of the particular transaction is set to the proposed commit time and written to persistent storage. After the commit finalization phase, a transaction coordinator may provide an indication, e.g., via programmatic interfaces to the requester of the commit, that the transaction has been committed. Note that at least some of the values indicated in the write set may not have been written to the respective new versions of the data items in some cases even though an indication that the transaction has been committed may have been provided. Such values may be written after the multi-phase commit completes in some embodiments, and may be referred to as "lazy" writes. In some cases, multiple writes of the values indicated in the write set may be performed at least partly in parallel. In one embodiment, lazy writes may not be used, and the updated values indicated in the write set may be written as part of the multi-phase commit. In various embodiments, unlike in some optimistic concurrency control schemes, no locks may be acquired or released during the commit process (or at any other time during the lifetime of a transaction).

In some embodiments, the values of various versions of data items (and the commit timestamps which differentiate one version from another) of the DMS may be distributed among a plurality of data storage nodes of the DMS, while at least some timestamps associated with the data items such as item-level read timestamps, table-level read timestamps, pre-commit timestamps etc. may be stored at other nodes referred to as timestamp storage nodes. Placing all the timestamps in the same record as the value for an item has certain advantages. When an item is read, the item's read timestamp can be updated in the same operation as the read. Additionally, the pre-commit timestamp can be returned with no additional cost, and can be stored in the transaction's read set for later use during validation. When writing an item, the commit time and new data value can be written atomically, and the write can be conditional on the commit time being monotonically increasing. Storing timestamps in a separate service (or separate timestamp storage nodes) than the data storage nodes also has potential advantages. For one thing, this allows the data itself to be stored more easily in a variety of formats, both row-based and columnar. Timestamps can remain hidden from clients who are permitted to read the data directly. Second, data can be re-sharded (e.g., assigned to partitions using one or more hash functions) and re-located without affecting how timestamps are accessed. Third, since storing a couple of timestamps per item may take much less space than storing the item's value itself, numerous items can potentially have their timestamps packed onto the same device or server. This enables support for batch application programming interfaces (APIs) that can read and update multiple timestamps in one request. Such batching may be valuable during the commit process when timestamps for a full read set must be checked and the commit timestamps for a write set must be updated. Fourth, different caching and/or replication policies can be used for the timestamps than for the stored data item values.

According to some embodiments, a client or user of a DMS may use programmatic interfaces of the DMS (such as web-based consoles, command-line tools, graphical user interfaces, APIs and the like) to provide preferred values for various parameters used for timestamp-based lock-free concurrency control. Such parameters may include, for example, (a) a maximum acceptable clock skew among nodes of the DMS, (b) a maximum acceptable difference between a storage node's clock time and a commit time of a transaction which accessed a data item of the storage node, (c) a maximum number of proposed commit times to be tried for a transaction before the transaction is aborted, (d) a version deletion criterion for data items, (e) a proactive read timestamp advancement policy, (f) a policy for validating reads on commit, (g) a policy for using read timestamps for groups of data items (such as entire tables or ranges of records within tables, e.g., instead of or in addition to using read timestamps for individual data items), or (h) a policy for reading cached data items. Reasons for using such parameters are discussed in further detail below.

In at least one embodiment, the DMS may collect various types of metrics as client applications access data stored at the DMS. Such metrics may include, among others, (a) transaction abort rates for a particular client application, resulting for example from read-write conflict detection, (b) transaction commit rates, (c) commit request response times, (d) read set sizes, (e) write set sizes, (f) read-only transaction rates, or (g) average or maximum number of pre-commit timestamps obtained for a transaction. The metrics may be provided to DMS clients or users via programmatic interfaces in at least some embodiments.

FIG. 1 illustrates an example system environment in which lock-free timestamp ordering based algorithms may be employed for concurrency control at a distributed data management service, according to at least some embodiments. As shown, a lock-free timestamp ordering based distributed data management service (DMS) 102 may be implemented using resources of a provider network 101 of system 100 in some embodiments. The provider network may also include other network-accessible services such as a relational database management service (RDBMS) 172 at which read and write locks are acquired as data is accessed during a transaction, an optimistic concurrency control database service (OCCDBS) 173 at which locks are acquired and released during transaction commit processing, as well as a virtualized computing service (VCS) 174 in the depicted embodiment.

The DMS 102 may comprise several subcomponents in the depicted embodiment, each implemented using software and/or hardware of one or more computing devices. The DMS may include a data storage node (DSN) fleet 134 comprising numerous DSNs such as DSNs 135A, 135B, 135C, 135D, 135E and 135F, for example, among which data items of various DMS clients' data collections may be distributed. Any of a variety of partitioning or sharding schemes may be used to determine which particular DSN should be used to store a given data item of a given DMS client in different embodiments. One or more directory/lookup managers 122 may be responsible for assigning data items to nodes, determining which node should be contacted to retrieve or write a given data item, and so on. One or more hash functions may be used by the directory/lookup managers 122 to map data items to DSNs in some embodiments. In the depicted embodiment, timestamps associated with data items (such as the data item-level read timestamps, table-level read timestamps, pre-commit timestamps, commit timestamps, etc.) may be stored along with the corresponding data items at DSNs 135. In other embodiments, a separate fleet of timestamp storage nodes may be used for storing timestamps separately from data item values.

At concurrency control subsystem 140 of the DMS, a transaction coordinator node fleet 146 may be maintained. The transaction coordinator fleet may include numerous transaction coordinator nodes (TCNs) 147, such as TCNs 147A, 147B and the like, which may implement lock-free timestamp ordering based algorithms for managing transactions directed to the data items stored at the DSNs. The timestamp ordering based algorithms may utilize data structures and timestamps of the kind shown in FIG. 2 to provide serializability for transactions without acquiring or releasing locks, e.g., using multi-phase commit processes of the kind introduced above.

The DMS 102 and/or other services of the provider network may implement programmatic interfaces 177 in the depicted embodiment. The programmatic interfaces 177 may include, for example, web-based consoles, command line tools, graphical user interfaces and/or APIs. Clients of the provider network services may utilize the programmatic interfaces 177 to issue commands/requests of various kinds from various client devices 180 (e.g., laptops, desktops, mobile devices and the like) and receive corresponding responses in at least some embodiments. For example, a DMS client such as an administrator of a data item collection may submit messages via programmatic interfaces 177 to submit preferred settings of various parameters to be used for the transactions associated with that data item collection. The parameter preferences may be stored in parameter settings database 144 in the depicted embodiment and utilized (e.g., by the TCNs 147 and/or other DMS components) to manage the transactions directed to the data item collection. Applications that access the data stored/managed at the DMS may be run at the client devices 180 in some embodiments, and such applications may use APIs implemented by the DMS to submit requests to start/commit/abort transactions, read data items, or write data items. At least some of the types of requests, commands or messages directed to the DMS 102 may be received and processed initially at one or more interaction managers 161 in the depicted embodiment. The interaction managers 161 may generate internal messages corresponding to the messages received from the client devices, and forward the internal messages to the appropriate subcomponents of the DMS for implementation in the depicted embodiment. The DMS may also include administrative subcomponents in some embodiments, responsible for tasks such as monitoring the health state or responsiveness of DSNs or TCNs, scaling up (or down) the number of DSNs and/or TCNS as workload levels change, and so on.

As shown in FIG. 1, in at least some embodiments a DMS which implements the lock-free timestamp ordering based concurrency control techniques introduced above may be implemented as one of a suite of services of a provider network 101 or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers or clients can connect to availability zones of the cloud provider network via a publicly accessible network (e.g., the Internet, a cellular communication network) by way of a transit center. Regions are connected to a global network connecting each region to at least one other region. This compartmentalization and geographic distribution of computing hardware enables the cloud provider network to provide low-latency resource access to customers on a global scale with a high degree of fault tolerance and stability. For example, DSNs 135 and/or TCNs 147 may be spread over multiple data centers, availability zones and regions around the world in some embodiments. In some cases, a given service of a provider network may be implemented using other services. For example, virtual machines implemented by the VCS 174 may be used to implement TCNs in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, software containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks. Various services of the cloud provider, such as an DMS, may include their own control plane servers (e.g., servers responsible for monitoring and scaling) and data plane resources.

Figure 2:
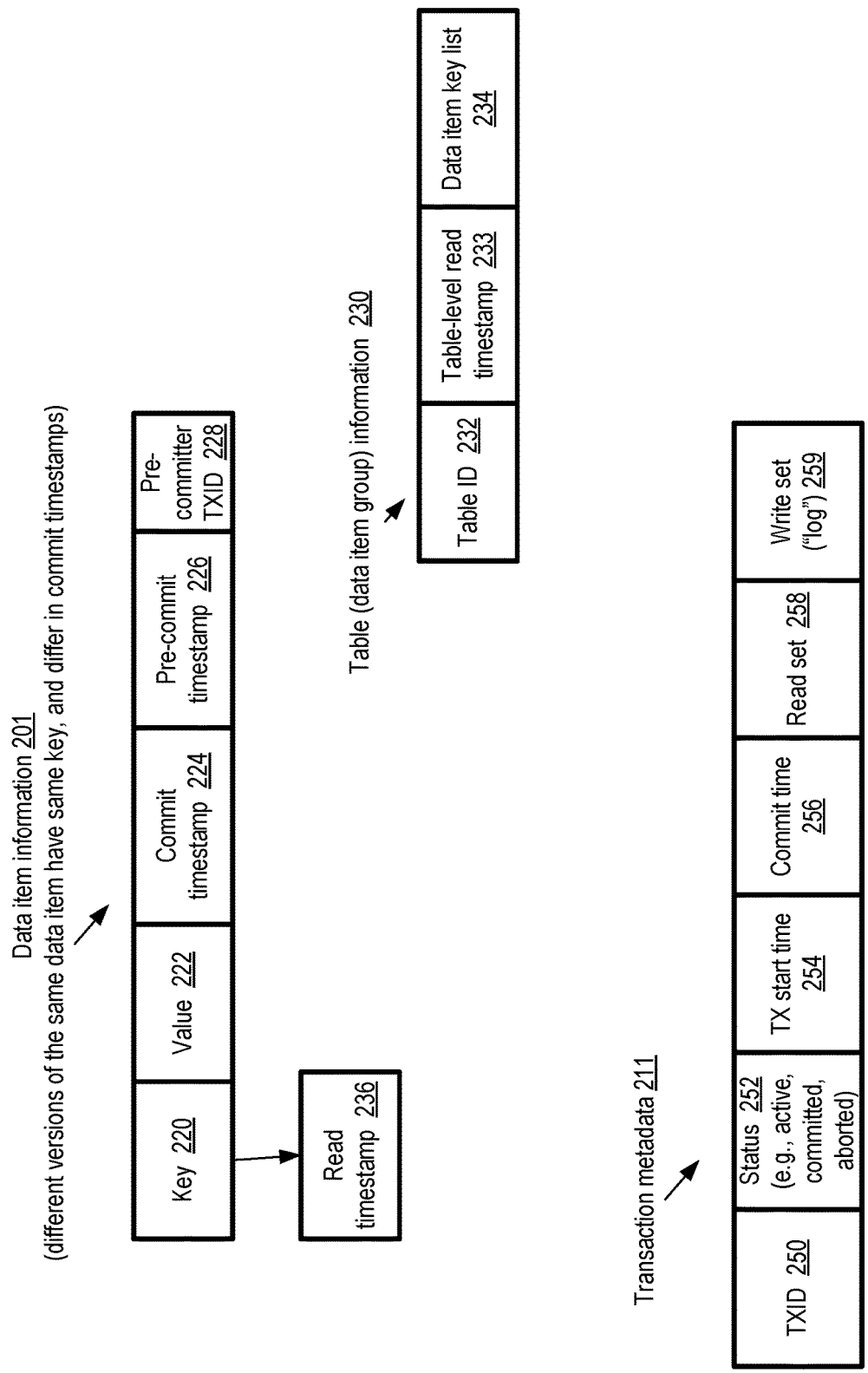
FIG. 2 illustrates examples of elements of data item version information, table information, and transaction metadata which may be maintained to implement a lock-free timestamp ordering based concurrency control, according to at least some embodiments.

FIG. 2 illustrates examples of elements of data item version information, table information, and transaction metadata which may be maintained to implement a lock-free timestamp ordering based concurrency control, according to at least some embodiments. In the depicted embodiment, multiple versions of individual data items can be stored, and data items are assumed to be organized or grouped into tables. Data item information 201 includes a unique key 220 and a value 222 for a given version of the data item. The value may comprise several different fields in some cases. Each version of the data item has a respective commit timestamp 224 indicative of the commit time of the transaction which wrote the value 222 stored in that version. Different versions of the same data item have the same key and different commit timestamps in the depicted embodiment (the values 222 may also differ among different versions in most cases). In addition, during commit processing of a transaction which writes the data item, a pre-commit timestamp 226 may also be stored at least temporarily for the data item, along with the pre-committer transaction identifier (TXID) 228 in some embodiments. Corresponding to each key 220, a data item-level read timestamp 236 may also be stored in the depicted embodiment, representing the TX start time of the most recently-committed transaction which read the data item with that key. As mentioned earlier, in at least some embodiments, data item keys may not be unique across tables (that is, two different tables may include a data item with the same key), so the combination of (table identifier, key) may be used to uniquely identify a data item.

The metadata 211 stored for individual transactions may include the transaction's identifier (TXID) 250, status 252 (e.g., whether the transaction is active, committed, or aborted), a transaction start time 254, a commit time 256, a read set 258 and a write set 259 in the depicted embodiment. The read set may indicate (e.g., using keys and data item commit timestamps) the specific versions of data items read during the transaction, and the write set may indicate the keys and values of various data items to which writes were directed in the transaction (note that the values may not actually be applied until and unless the transaction's commit process completes successfully).

For each table, the metadata 230 stored at the DMS may include a unique table name or identifier 232, a table-level read timestamp 233 and a data item key list 234 in the depicted embodiment. The table-level read timestamp 233 may be set to the TX start time of the most recent transaction which included a query directed to the table (e.g., an SQL style query which may have led to a read of multiple data items, or a scan of all data items, of the table) in various embodiments.

The data item version information, associated timestamps, transaction metadata and/or table metadata shown in FIG. 2 may be stored at persistent storage in various embodiments. Different subsets of the information may be located at respective nodes or servers of the DMS in some implementations. Note that the various timestamps indicated in FIG. 2 may be generated using local clocks at different nodes of a DMS in some embodiments, and that such local clocks may not necessarily be synchronized. For example, read timestamps for data items may be generated and/or stored at data storage nodes of a DMS, while commit timestamps may be generated/stored at separate timestamp storage nodes or at transaction coordinator nodes, without requiring synchronization of the clocks at the data storage nodes with the clocks at the transaction coordinator nodes. Different transaction coordinator nodes with unsynchronized local clocks may use those clocks to assign timestamps (e.g., including start timestamps, pre-commit timestamps, and/or commit timestamps) to transactions that may attempt to access the same data items or the same tables concurrently or near-concurrently. As indicated earlier, the algorithms described herein do not rely upon clock synchronization for correctness. When timing-related terms such as "most recent" are used in the discussion of the lock-free concurrency control algorithms, they may be interpreted as "most recent, given the potentially unsynchronized timestamp information available" with respect to at least some embodiments.

FIG. 3 illustrates examples of data items and some associated timestamps, according to at least some embodiments. Very simple examples are presented in FIG. 3 to illustrate the concepts involved. The first example 330 of FIG. 3 shows stored versions of data items whose keys are either x, y or z. The value 29 was written for the key x with a commit timestamp 11/8/2021, 8:33 am (that is, the transaction that wrote that value 29 for x successfully committed with a transaction commit time of 8:33 am on 11/8/2021). Later, a different value 42 was written for key x, at 2:48 pm on the same day. Similarly, y has two versions, one with a value of 29 with a commit time of 11/8/2021, 8:33 am, and another with a value of 0 and a later commit time of 11/8/2021, 2:48 pm. The data item with key z has only one version, with a value of 101 and a commit timestamp of 11/8/2021, 8:33 am.

Suppose that a transaction that reads items x, y and z starts at 2:45 pm on 11/8/2021 (i.e., the transaction's start time is 11/8/2021, 2:45 pm) in the example 330 scenario. If this transaction attempts to read any of the three data items before 2:48 pm, the 8:33 am versions of the data items would be the only ones available in the example 330, and those versions would be read. The benefit of storing multiple versions is that even if any of the reads of this transaction occur after 2:48, they would still succeed, as a version whose commit time is less than the transaction's start time of 2:45 pm remain available. Regardless of when the reads are actually performed, the values 29, 29 and 101 would be obtained for x, y and z respectively if the versions shown in example 330 are stored at the DMS. Had only a single version of each data item been stored instead of multiple versions, the 8:33 am versions of x and y would not be available, and the transaction would have been aborted since the commit time (2:48 pm) of the only x and y versions stored would have been after the start time (2:45 pm) of the transaction, indicating that x and y were overwritten after the transaction started. Recall that in various embodiments a transaction's start time is considered the time as of which all of the transaction's reads were performed, so if the only version available of a read data item is a version overwritten subsequent to the start time, the transaction cannot succeed and has to be abandoned/aborted.

Storing multiple versions thus has the benefit of allowing more read-containing transactions to succeed than storing single versions. When an item is read, the system returns the value of the version with the next earliest commit timestamp compared to the requesting transaction's start time. For example, a transaction with a start time of 12:00 noon on 11/8/2021 would get a value of 29 for x, while a transaction with start time of 3:00 pm on 11/8/2021 would get a value of 42 for x. If no version with a commit timestamp that precedes the requesting transaction's start time exists, an exception or error may be returned, even if the data item was created subsequently and therefore is present in the DMS. With a multi-version DMS, in at least some embodiments read-only transactions never abort (assuming there is no limit on the number of versions stored), and commit requests of read-only transactions always succeed.

A consideration of write-only transactions may help motivate the use of other types of timestamps, including pre-commit timestamps of the kind shown in example 332 of FIG. 3, as well as read timestamps. Each write-only transaction is assigned a commit time when the transaction completes. During the execution of a transaction containing only writes, in various embodiments each write may be for example buffered in memory (in an in-memory write set implementation) or written to a persistent transaction log (in a log-based write set implementation), but not immediately applied to the data items targeted. In general, the writes could be directed to different items on different storage nodes/servers and even different tables. Write-only transactions never conflict. But two concurrent transactions that write the same items do need to ensure that their writes are not interleaved in a way that might result in inconsistency. Ordering all transactions according to assigned commit times guarantees serializability. At commit time, a designated transaction coordinator may use the current value of its local clock as the proposed commit time in various embodiments. The proposed commit time may be rejected if some of the items being written already have a later commit timestamp.

First consider the case of a single-version store and write-only transactions. In addition to a commit timestamp, each data item may be assigned an associated "pre-commit" timestamp in various embodiments. For each item in the transaction's write set, the transaction coordinator sets the pre-commit timestamp to its proposed commit time as long as this commit time is later than both the currently-stored commit timestamp and the currently-stored pre-commit timestamp. That is, pre-commit timestamps must be monotonically increasing for each item in such embodiments. The pre-commit timestamps may be updated in parallel for all items being written as part of a transaction in some implementations. If any of these operations fail because the monotonicity condition is not met, then the transaction coordinator may propose a later commit time and try again to set it as the pre-commit timestamp for each item in some embodiments. Even with write contention, the coordinator may typically be very likely to succeed in a small number of retries.

The pre-commit timestamps may be separated from the actual commit timestamps since the commit timestamp for an item should not be overwritten until the system is sure that the transaction is committed and the new value is written. Otherwise, failures could leave the data in an inconsistent state where a newly written commit timestamp is stored with an old data value, and readers could incorrectly access the wrong data.

Once all of the pre-commit timestamps have been successfully updated, the transaction may be allowed to commit. For atomicity, the coordinator may first append the transaction's write set to a persistent transaction log and then append a commit record. The transaction may be considered officially committed when the commit record is stably logged or the transaction state is changed to "committed" in a designated record in at least some embodiments.

After a transaction is committed, in some embodiments the coordinator (or some other component responsible for propagating writes) may lazily or asynchronously write new values and commit timestamps in the data store. These writes can be performed in parallel on multiple items if desired in some implementations. If the coordinator fails during this process, another coordinator node may detect that the transaction was left incomplete, read the transaction log to determine which writes were performed, and take over the process of writing or propagating the updated data values in at least some embodiments.

Note that multiple concurrent transactions may commit at close to the same time and may be writing to the same items. To correctly deal with items being written out-of-order, the attempt to write a new data value and commit timestamp may be conditional in at least some embodiments; the write may only be allowed to succeed if the commit timestamp being written is greater than the one that is already stored. This allows committed transactions to write their data in any order with the largest commit timestamp winning. The write condition may not compare the new commit timestamp to the stored pre-commit timestamp in various embodiments since the transaction that proposed this pre-commit time may fail and never write the data. It may be acceptable for a failed transaction to leave its pre-commit timestamp on a stored item since the next transaction that writes this item will overwrite it with a later timestamp in such embodiments.

While failed write-only transactions do not impact other writers, they may affect readers. Specifically, when a reading an item, three possible timestamp conditions may hold in some embodiments. First, the reading transaction's start time may be earlier than the stored commit timestamp for the item, in which case the read cannot be performed (in a single-version store). Second, the start time may fall between the stored commit timestamp and the pre-commit timestamp. In this case, the stored item may be the correct value to return but the system cannot be certain. The problem is that multiple transactions may be writing this item, and one of them may have a commit time that is earlier than the start time. The conservative approach is for the read operation to return a failure exception. Third, the read time may be after the pre-commit timestamp. This indicates that some transaction is attempting to write the item that is being read and may have already committed.

This third scenario may be the most problematic. The read operation cannot simply return the currently stored value. The read operation may block waiting for the item to be written since it is known that a new write is imminent. This approach may work well in the common case where failures and transaction aborts are rare and the commit process is short. However, what if the write transaction fails and never completes its write of this item? The reader would wait indefinitely, or at least until some other transaction writes the item. Failing the read and aborting the transaction is not a solution. The application most likely would restart the read-only transaction with a later start time, and the same problem would arise.

The most viable recovery is for the reader to check on the status of a pending write. Recall that as indicated in FIG. 2, status metadata stored for each transaction indication of whether the transaction is active, committed, or aborted. In some embodiments, for each data item the DMS may store the set of transaction IDs for transactions that have written a pre-commit timestamp but have not yet written a new item value. For each transaction on which a reader is waiting, the transaction's ID may be looked up in the status table. If the status indicates that the transaction has committed, then the reader can expect that a new value will be written shortly, and the reader may wait. If the transaction is not in the committed state, in some embodiments the reader may abort the transaction by setting its status to aborted. Once in the aborted state, a transaction manager cannot later commit the transaction in at least some embodiments.

With a multi-version DMS, the system behaves similarly in various embodiments. The main difference is that transactions add new versions to the data store. Each new version may initially contain the pre-commit timestamp and transaction ID with a null commit timestamp and null data value. When and if the transaction completes its commit successfully, the version's data and commit timestamp may be filled in. Example 332 of FIG. 3 shows a scenario in which items x and y were written by the same transaction and the new version for item y is yet to be updated. In the scenario of example 332, a transaction with a start time of 2:45 pm can read the old version of item x that was committed at time 8:33 am. This transaction can also read the old version of item y since it knows that the version yet to be written has a commit time that is later than its start time and also knows that no future transaction can be assigned an earlier commit time.

Now consider a read-only transaction with a start time of 2:55 pm. Can it read the new value of item x that was written at 2:48 pm? The issue is that some other transaction that is currently committing could be writing item x and could have been assigned a proposed commit time that falls between the previously highest pre-commit time (2:48 pm) and the start time (2:55 pm), such as a commit time of 2:51 pm. This could happen either because this commit time was assigned by a machine with a slow clock that is behind real-time or because the transaction coordinator experienced a delay between when it proposed the commit time and when it added a new version for item x. This problem may be referred to as the "writes jump ahead of reads" problem.

The solution employed in at least some embodiments may be for readers to record their read timestamps for each item. That is, before reading an item, the system may ensure that a read timestamp associated with the item's key is at least as large as the start time of the transaction performing the read operation. The read timestamp may be monotonically increasing in various embodiments. When writing a pre-commit timestamp for an item, an additional condition may be checked in at least some embodiments, namely that the proposed commit time is greater than the last recorded read timestamp for that item. That is, new commit times must be later than any previous commit times or proposed commit times for each item being written and also later than any previous read times.

Revisiting the example of a transaction with a start time of 2:55 pm, before reading item x, 2:55 pm will be set as the read timestamp for item x (assuming that this is later than the currently recorded read timestamp). This may prevent any future transaction from writing item x with an earlier commit time.

Thus, the reader is now safe to read the latest stored version of item x. When reading item y, its read timestamp is also set to 2:55 pm. However, in example 332, the version that needs to be read still has a null value. The reader may therefore wait for the value of this version to be written. If not written in a timely manner, the reader may attempt to abort the writer transaction in some implementations. If the write transaction has already committed but is just slow completing its writes, then the reader may wait in such implementations.

Transactions that perform both reads and writes may be processed using the basic techniques described above for read-only and write-only transactions in various embodiments. Additionally, a validation phase, similar in some ways to that in optimistic concurrency control but differing from optimistic concurrency control in that locks are not needed, may be implemented. A start time may be assigned to the transaction when the transaction starts as described above. During the transaction, read operations access the item versions that are associated with this time (i.e., the item versions that have commit timestamps earlier than the start time) and update the read timestamp on the items that are read. As in the case of a write-only transaction, a commit time may be assigned when the transaction attempts to commit its writes. The proposed commit time is set as the pre-commit timestamp on the items in the write set, and having all of these timestamp updates succeed may be required before the transaction can commit.

However, to ensure serializability, a new read set validation step is needed during the commit process in various embodiments. This is because allowing a transaction to read at one time and commit at a different time would not result in a serial execution with respect to other transactions. The transaction's read set must be checked to ensure that the versions that were read during the transaction are the latest versions as of the commit time (which determines where the transaction fits into the serial transaction order). Effectively, a read-write transaction's start time is adjusted to match its commit time in at least some embodiments.

Validation may require two operations for each item in the transaction's read set in various embodiments. First, the system may check that the version that was previously read, which is recorded in the read set along with the item's key, is still the latest version whose commit timestamp precedes the proposed commit time. If there is a pre-commit timestamp on any of the items that falls between the transaction's start time and commit time, then the validation process could wait but a reasonable option used in some implementations is to simply abort presuming that another conflicting transaction is committing. It may be acceptable for a transaction with a higher commit time to be writing or to have already written these same items.

Second, the system must ensure that the condition verified in the first operation cannot be invalidated by future transactions. That is, no future transaction is permitted to write new versions with earlier commit times. In order to enforce this, the read timestamps for all of the items in the transaction's read set may be advanced to the proposed commit time. If an item's read timestamp and versioned data are stored in separate tables on possibly different DMS nodes, then updating the timestamp may be done before checking the version that was previously read. If they are co-located, then these two operations may be done in one step. If the read set validation is successful, then the read-write transaction will eventually commit. The remainder of the commit process may be the same as for a write-only transaction in various embodiments: writes may be flushed to the log, the transaction status may be changed to committed, and the new values may be written (potentially lazily or asynchronously) to the storage nodes.

Figure 4:
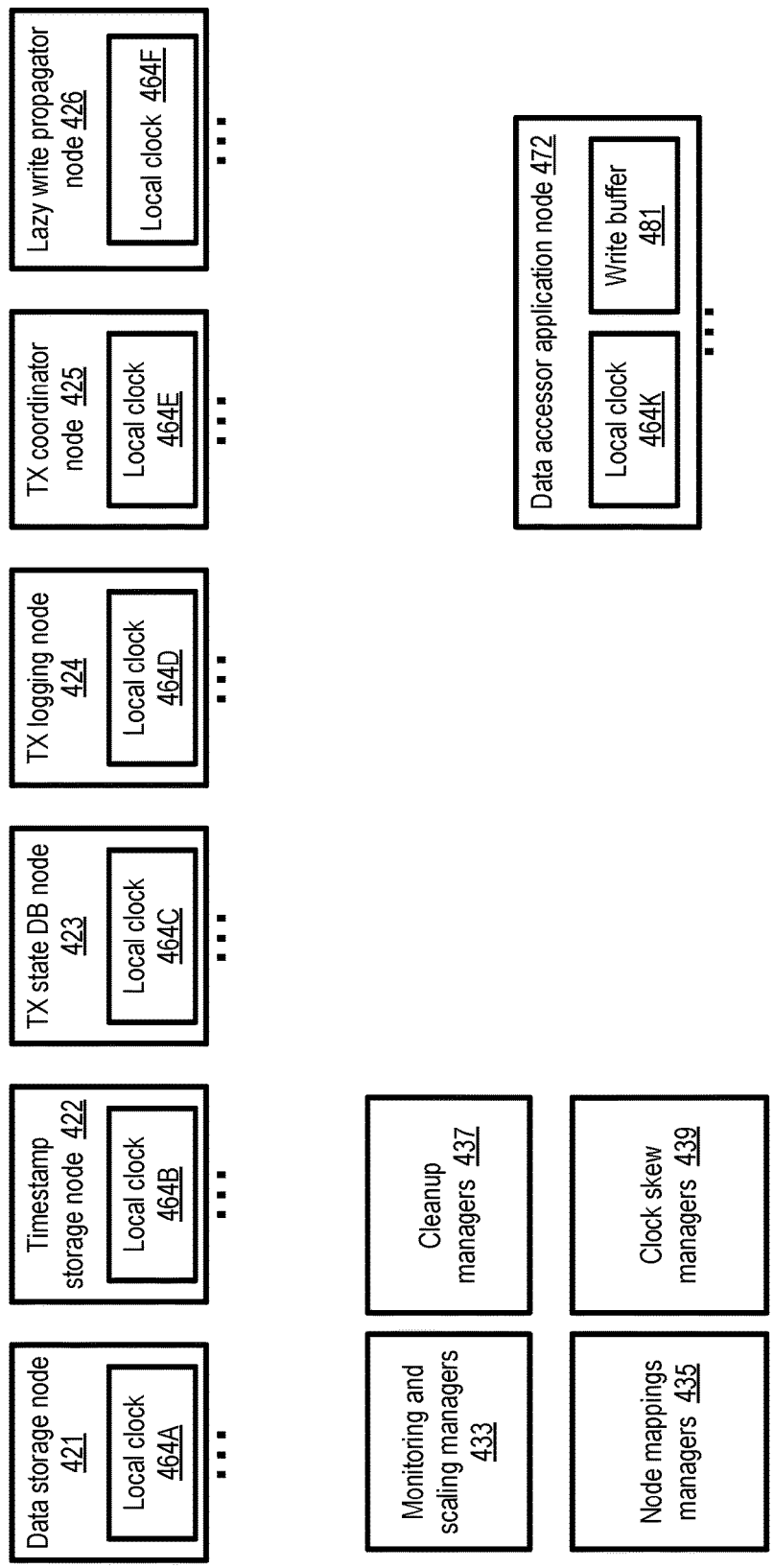
FIG. 4 illustrates example types of nodes of a distributed data management service in which local clocks of the nodes may be utilized for timestamps, according to at least some embodiments.

In some embodiments the lock-free timestamp ordering based concurrency control techniques may be utilized in large-scale distributed environments, with local clocks at various nodes of the distributed environment used for generating timestamps, without requiring synchronization of the local clocks. FIG. 4 illustrates example types of nodes of a distributed data management service in which local clocks of the nodes may be utilized for timestamps, according to at least some embodiments. Each of the different types of nodes shown in FIG. 4 may comprise one or more processes or threads of execution. At least some of the nodes may run at respective computing devices, with communication between nodes being accomplished using network messages. In some cases, several different nodes may run at the same computing device.

In the embodiment depicted in FIG. 4, the values of data item versions are stored at a fleet of data storage nodes 421 (with each data storage node comprising a local clock 464A), while at least some of the timestamps associated with the data items or groups of data items are stored at a separate fleet of timestamp storage nodes 422 (with each timestamp storage node comprising a local clock 464B). A given transaction, initiated at the behalf of a data accessor application node 472, may include reads and/or writes directed to data items whose values are stored at multiple data storage nodes in the depicted embodiment. In some embodiments, the transaction start times may be set based on local clocks 464K of the data accessor application nodes; in other embodiments, the local clocks of transaction coordinator nodes 425 may be employed to set transaction start times. Transaction state information, such as at least a subset of the kinds of metadata shown in FIG. 2, may be stored at a fleet of TX state DB nodes 423, each of which has a local clock 464C. A fleet of transaction logging nodes 424 (each with local lock 464D) may be employed to log write requests of transaction write sets to persistent storage in some embodiments; in other embodiments, write sets may be stored in write buffers 481 of the data accessor application nodes 472.

Transaction coordinator nodes 425, each comprising a local clock 464E, may be responsible for orchestrating multi-phase transaction commit operations of the kind introduced above in some embodiments. In some embodiments, the TX (transaction) coordinator nodes may also be used for transaction starts and/or transaction aborts. The values which are indicated in write sets for various committed transactions may be propagated or applied by a fleet of lazy write propagator nodes 426 (each with a respective local clock 464F) to the new data versions created as part of the commit processing in some embodiments. In other embodiments, or for certain clients, the writes may be propagated or applied by the TX coordinator nodes 425. Whenever a new timestamp is needed for a particular operation, the local clock of the node at which the operation is being performed may be used for that operation in the depicted embodiment. For example, transaction start timestamps may be generated using local clocks 464K of data accessor application nodes 472, while transaction commit timestamps may be generated at TX coordinator nodes 425.

In the embodiment depicted in FIG. 4, one or more monitoring and scaling managers 433 may be responsible for tracking the status of various other nodes and adding/removing nodes as needed based on workload changes, performance measurements, detected failures and the like. A fleet of cleanup managers 437 may be assigned to perform recovery and data cleanup operations such as removing pre-commit timestamp entries for transactions that have failed or aborted, deleting versions of data that satisfy version removal criteria, and so on. Node mappings managers 435 may be responsible for determining which particular nodes are to be used for a given data item or group of data items, a given data access request and/or a given transaction state change request (e.g., transaction start, transaction commit, transaction abort etc.) in some embodiments; such node mappings managers may maintain indexes or use hashing-based sharding/partitioning algorithms to choose nodes for individual operations or data items. In at least one embodiment, one or more clock skew managers 439 may be responsible for periodically checking the clock skews between different nodes of the DMS, and initiating actions such as resetting/restarting local clocks or restarting entire nodes whose local clocks have drifted beyond maximum acceptable clock skew thresholds (such thresholds may be selected as tunable parameters by clients of the DMS in some cases).

In some embodiments, to deal with cases in which large differences happen to arise in the timestamps provided by local clocks of data storage node and local clocks of transaction coordinators, which could potentially lead to unnecessary transaction delays or aborts, a tunable parameter representing the maximum acceptable difference between a storage node's clock time and a commit time of a transaction which accessed a data item of the storage node may be used. If such a difference exceeds the threshold, one of the two local clocks may be adjusted to bring the two clocks into closer synchronization in some embodiments. Monitoring and scaling managers, cleanup managers, node mappings managers and clock skew managers may each also comprise one or more processes or threads running at one or more computing devices (e.g., control plane servers of the DMS) in the depicted embodiment. Other types of nodes and/or administrative subcomponents may be deployed in some embodiments as part of a distributed DMS in addition to those shown in FIG. 4.

In general, timestamp ordering is a technique which provides isolation (the "I" in the well-known ACID properties desired for at least some transactional systems, where the "A" refers to atomicity, the "C" refers to consistency, and the "D" refers to durability). It guarantees serializability, the strongest form of isolation, by assigning a partial global order for all transactions in various embodiments. The techniques presented in this document do so in a decentralized manner without using locks. A key benefit from a systems architecture perspective is that timestamp ordering permits isolation to be implemented independently from atomicity and durability. Atomicity is usually achieved using logging. The writes within a transaction may be written to a log, and, after commit, that log may be replayed until all of the writes have been successfully applied to one or more data stores. In a traditional database, a single transaction log may be used to order transactions based on the order of their commit records within the log and also to order writes within a transaction based on the order in which these writes appear in the log. Timestamp ordering defines the serialization order for all transactions. Thus, a log is just needed to persistently store a transaction's writes until they can be applied to a more permanent store and to order the writes in case a transaction includes multiple writes to the same item. Each transaction may have its own transaction log in some embodiments in which lock-less timestamp ordering is used.

Durability is a property of the storage system in which items are permanently stored. After a transaction commits, its logged writes may be applied to a data store in various embodiments. To achieve high durability, the data may be replicated across multiple storage nodes in some embodiments (such as some of the data storage nodes shown in FIG. 4), and new storage nodes may be placed into service when current nodes fail. The techniques for replication and fault-tolerance of data items (and their timestamps) are orthogonal to timestamp ordering. Consistency may be considered the responsibility of the data accessing applications in at least some embodiments. The sequence of operations within a transaction should transform the database from one state to another in which application-specific integrity constraints are maintained. By providing atomicity and isolation, in various embodiments, a DMS similar in features and functionality to DMS 102 of FIG. 1 may ensure that intermediate, inconsistent states are not visible while a transaction is in progress and are rolled back if a failure occurs.

As mentioned earlier, synchronization of clocks used for generating timestamps at respective nodes of a distributed DMS may not be required in various embodiments. A nice property of timestamp ordering is that it ensures a serializable transaction execution history even if the read and commit timestamps are obtained from unsynchronized clocks. The timestamps that are assigned to two transactions define their relative order.

For read-only transactions, the main downside of timestamps that are taken from poorly synchronized clocks is that reads may access stale data. For example, suppose that a transaction writes new data and commits. A subsequent read-only transaction whose coordinator has a slow local clock may assign a start time that is before the previous transaction's commit time, causing it to read old data versions (or fail altogether with a single-version store). In other words, in at least some embodiments, while the system provides serializability, it may not ensure strict serializability (also known as external consistency) with unsynchronized clocks.

For transactions that are executed in order within a single "session", the DMS may easily ensure that their commit/start times are monotonically increasing, and in other cases, hybrid logical/physical clocks may help in some embodiments. But there may not be a good general way to provide external consistency short of physical clock synchronization. Synchronized (or nearly synchronized clocks) may ensure that the commit and start times that are assigned to transactions are commensurate with the order in which those transactions commit or start, even if the transactions are executed on different servers or nodes.

For write-only and read-write transactions, the main downside of using clocks that are widely out-of-sync is that transactions may experience an increased abort rate or may experience retries during the commit processing (leading to unnecessary delays). For example, suppose that a transaction writes some items and commits. A subsequent transaction that writes some of the same items may get its commit time from a slow clock, causing it to fail when trying to update the items' timestamps. The result is not disastrous since a transaction coordinator can pick a later timestamp, preferably with knowledge of the items' latest commit times, and then retry at least a portion of the commit protocol.

More concerning is when a transaction commits with a commit time that is far into the future since that may cause future write transactions to fail. And it may prevent other transactions from reading this data, leading to aborts for read-only transactions in a single-version store and aborts of read-write transactions even with multi-versioning. This may be avoided by placing limits on how far a commit time can be in advance of a storage node's clock, e.g., via a tunable parameter which may be specified via programmatic interfaces by a DMS client. Even enforcing such limits may not always help, e.g., if the storage node's clock is also widely out of sync. As such, closely synchronized clocks, while not required for correctness, may help improve the system behavior and application experience in at least some embodiments. In at least some embodiments, clock skews between different nodes of a DMS may be monitored at least to some extents by administrative components such as clock skew managers of FIG. 4, and corrective actions (such as clock time changes or node restarts) may be implemented for nodes whose clocks are identified as being widely out of sync. Values of the kinds of tunable parameters mentioned herein, which are associated with resolving problems that may arise due to unsynchronized local clocks in a distributed environment, may be selected by DMS clients or (if a client does not specify them) by the DMS in the embodiment shown in FIG. 4.

In various embodiments, two transactions may not be assigned the same commit time if they write the same data item. It is unlikely but possible in some embodiments that two transaction coordinators get the current time from different local clocks and obtain the exact same proposed commit time for their two conflicting transactions. In this case, one of the coordinators will be able to write its proposed commit time as the pre-commit timestamp for items being written as long as the proposed time is later than previous commit times. But the other coordinator will fail when it attempts to write the same pre-commit timestamp since such timestamps must be monotonically increasing. This other coordinator may then re-read its local clock and get a new, later commit time. Note that it may be acceptable for two transactions that write non-overlapping sets of items to use the same commit time in at least some embodiments. Also, in various embodiments, it may be acceptable for different read-only transactions to use the same transaction start time.

Although transaction starvation due to multiple commit attempts may technically be a possibility in some embodiments, it may be extremely unlikely in most implementations. A transaction coordinator may obtain a proposed commit time from its local clock, but will not be allowed to commit at this time if some other transaction that writes the same item has already placed a later commit timestamp on that item. The coordinator may then choose a later proposed commit time and try again. In theory, this could happen indefinitely. As an example, suppose that two transactions both write items x and y and are trying to commit concurrently. The first transaction chooses a commit time that is later than the second, and writes item x's commit timestamp. The second transaction first writes the commit timestamp for item y, and then, when attempting to write item x with its earlier commit timestamp will fail. It may then generate a new commit time that is later than that of the first transaction, and write this as the commit timestamp on item y. Now, when the first transaction attempts to update the commit timestamp on item y, it will fail. This sequence could continue over and over again. While race conditions of this sort are possible in theory, they are not likely in practice. A simple solution in some embodiments may be to abort a transaction after some bounded number of unsuccessful commit attempts, with the number of unsuccessful commit attempts being a client-specified or DMS-selected tunable parameter.

While multi-version data stores are used in many of the examples discussed herein, multiple versions are not a requirement for the techniques introduced herein. There are trade-offs between these two approaches to versioning. A single-version store clearly uses less space and avoids algorithms for deciding when to collect old versions that are no longer useful. A multi-version store allows read-only transactions to never abort even when concurrent transactions are writing the same items. Older versions of data items may be discarded in various embodiments in which multi-version stores are used, e.g., in accordance with version management policies or parameters specified/selected by clients (such as the maximum number of versions to be stored for any given data item, or the maximum duration for which a given version can be stored). An alternative approach to dealing with older versions, employed in some embodiments, may comprise retaining periodic snapshots. For example, although data items may be continuously updated throughout the day, a customer of a DMS may wish to retain the item versions as of midnight each day and discard the intermediate versions. This permits so-called "time travel" queries to compare data from different days while avoiding the cost of storing unnecessary versions. Similarly, in some embodiments DMS customers may explicitly mark certain snapshots as ones to be retained while versions that are not explicitly marked may be discarded. Such selective version retention may introduce some complexity. The DMS may keep track of the holes in the version history where previously existing versions have been deleted, and it may reject read operations (and abort transactions) that attempt to read one of these missing versions.

The proposed timestamp ordering based techniques use read timestamps in various embodiments. Ideally, no writes would be needed while processing a read or query. But this may not be achievable in practice. Recording the time that was used when reading an item is needed to prevent future transactions from producing versions of that item with commit times that are earlier than the read time. Otherwise, multiple reads with the same read time may return different values for the same item, that is, reads would not be repeatable. By comparison, locking schemes typically acquire read locks when items are read, which also involves a write to update the lock table. Optimistic concurrency control schemes also perform writes during the validation phases to lock the items that had been previously read. And these schemes perform additional writes to release the locks after a transaction is committed.

A data item's read timestamp may not necessarily have to be updated every time it is read in some embodiments. Since the read timestamp for an item is monotonically increasing, it may only be updated when the currently stored timestamp is earlier than the time at which the item is currently being read. So, for example, if an item is read multiple times within the same transaction, then the second read may not update the read timestamp. Also, if two concurrent transactions read the same item, it is possible that the transaction with the later read time will read the item first, meaning that the read timestamp will not be updated when the second transaction reads this item. Moreover, in a multi-version store, the read timestamp may not need to be updated when reading a version other than the latest version. Another option employed in some embodiments is to periodically advance the read timestamps on items or tables even the items or tables are not actively being written, e.g., in accordance with a client-specified or DMS-selected parameter indicating the periodicity of such read timestamp advances and/or the amount by which the read timestamps should be advanced. This may allow transactions to avoid updating the read timestamps in more cases.

In some embodiments, a read timestamp may be updated in parallel with a read operation, but this approach may require additional validation. To avoid a validation step when committing a read-only transaction, the read timestamp on an item may have to be set to a value that is no earlier than the start time of the transaction, and this updating of the read timestamp must be done before the item's current value is returned. If the read timestamp is stored along with the item being read, then it can be updated while processing the read request. But writing a new timestamp potentially may add latency to every read operation. To eliminate the impact on read latency, an alternative employed in some embodiments is to permit reads without updating a read timestamp (also known as optimistic reads), and then to validate those reads when the transaction commits. In other words, a read-only transaction may perform the same validation process in such embodiments as a read-write transaction, except that its read set is validated against its start time rather than the commit time. This validation updates the read timestamps on the items that were read. One downside is that a read-only transaction may be aborted, though that is still unlikely with closely synchronized clocks. The main consequence of this optimistic read approach is the added processing and added network traffic during commit.

A hybrid approach may be employed in some embodiments, wherein an item may be read without updating its read timestamp, and the read timestamp may be updated in parallel. Before responding to the application with the value that was read, the item and its commit timestamp may be added to the transaction's read set along with a flag indicating that this item must be validated on commit in one such embodiment. A subsequent or parallel operation may be submitted to update the item's read timestamp. When this timestamp update succeeds, the validate-on-commit flag in the read set can be cleared. When the transaction commits, no further validation may be required unless some items in the read set still have the flag set in such embodiments. Effectively, reads may be validated in the background while the transaction is active, and, in the best case, all of the validation is completed before the application requests that the transaction be committed. The use of such flags for validating reads on commit may be controlled using a tunable parameter or policy (specified by DMS clients or selected by the DMS) in some embodiments.

In some implementations in which data items are grouped into tables or other similar item collections, a single read timestamp may be maintained for the table rather than for individual items. The purpose of recording read timestamps is to correctly deal with poorly synchronized clocks that might allow a write transaction to commit with an old clock value after a read transaction has already read the item that is being written. With closely synchronized clocks, that should be rare in practice. So, coarse grain timestamps may be used without negative consequences in at least some embodiments. The DMS may maintain a single table-wide read timestamp that is updated whenever any item in that table is read. For transactions that write items in that table, their commit times must be later than the table's read timestamp; other than that, the commit process may remain unchanged.

Using a table-wide read timestamp may have three main advantages over individual item timestamps in at least some embodiments. First, the table-wide timestamp approach uses less space to store timestamps. Second, for transactions that read many items from the same table, the timestamp must be updated at most once. In fact, if it is known in advance which tables are being accessed, then their read timestamps can be updated when the transaction starts thereby allowing subsequent read operations to avoid timestamp updates altogether. Third, it works for arbitrary queries, such as those that involve range scans, not just for reads of individual items. In some embodiments, a tunable parameter (settable by DMS clients) may be used to indicate whether table-level or item-group-level read timestamps should be used, or whether read timestamps should be used at the individual data item level only.

In the techniques proposed herein, a read-write transaction does not actually need to perform its reads at a particular time since its read set is validated before it can commit. In fact, requiring reads to access the version that existed when the transaction started can be detrimental. Specifically, reading a version that is not the currently latest version guarantees that the transaction will eventually need to be aborted since its read set validation will not succeed. Also, with a single-version store, a read may fail unnecessarily when a new version is written after the transaction started but before the read occurred. However, the DMS may not generally know, when a transaction starts whether it is a read-only or read-write transaction. Thus, it may be best for the DMS to behave as though it is a read-only transaction until the first write is performed. Read-only transactions have the benefit that no commit-time validation is required.

If a data accessing application were to declare in advance that a transaction was going to read and write data, then the transaction processing may be simplified in some ways. For one thing, the read timestamps on items may not need to be updated during a read; these may be updated during the commit process. For another thing, the DMS may not need to locate the version that matches the read time; it may simply read the latest version. With a single-version store, aborts from failed reads may be avoided since reads never fail. Also, reads may not need to wait for a pending write when there is a pre-commit timestamp but not yet a written new value; the transaction could abort immediately thereby saving time and work.

A common subclass of read-write transactions are read-modify-write transactions that read and update the same item, such as incrementing a stored counter. For such transactions, some optimizations may be implemented in various embodiments. During the validation process, the read timestamp for an item need not be updated since writing its proposed commit time as the item's pre-commit timestamp serves the same purpose. If the transaction reads and writes only one item, then the commit process may be further simplified. The item's latest value in a single-version store or new version in a multi-version store can be written with one operation; no pre-commit timestamps may be required. This single write may include two conditions: one to ensure that the previously read version is still the latest and a second to ensure that the commit timestamp is monotonically increasing. For writes to multiple items on the same storage node, a single write may also be used assuming that the storage node has the ability to atomically write multiple items.

In various embodiments, transactions may read their own writes. However, the techniques for doing so may be orthogonal to the concurrency control scheme. In at least some embodiments, systems may buffer writes in the memory of a transaction coordinator or client until the transaction commits. Read operations for items that were previously written in the same transaction may fetch their data from the write buffer. These reads may be performed locally and need not update the item's read timestamp; they are automatically valid at commit time.

Long-running transactions may be handled without significant problems in the proposed techniques. Unlike with a locking scheme where a long-running transaction can grab a lock on a popular item and cause other transactions to wait, timestamp ordering allows other transactions to commit without interference in various embodiments. A write transaction may commit its writes even if a long-running transaction has already read those items or buffered writes for those same items. The length of a transaction may mostly impact its own likelihood of aborting in the timestamp ordering approach introduced herein. With a single-version store especially, as the time between the start of the transaction and when it reads an item increases, so does the chance that some other transaction would have written that item in between, thereby overwriting the version that the transaction needs to read. With a multi-version store, long-running read-only transactions are readily supported provided the retention period for old versions exceeds the length of a transaction. For a long-running read-write transaction which reads and writes items over an extended period, the process of validating its read set may be more likely to fail if other transactions are updating the same items.

Some data accessing applications may utilize "time travel" queries. Time-travel queries are executed against a snapshot of the data that existed at a previous point in time. Supporting time-travel queries in a read-only transaction uses the same mechanism as ordinary read-only transactions in various embodiments. Instead of the system choosing the start time based on when the transaction started, the transaction's start time may be set to the "as of" time specified by the application in its query. For read times that are far in the past, this works best with a multi-version store that retains old versions.

This timestamp ordering technique introduced herein makes no assumptions about where data items are stored in various embodiments. It simply reads and write individual items and their timestamps. Transactions may involve items from different partitions of the same table, items from different tables, and even items from different regions. The mapping from keys to partitions and partitions to machines can change at any time, even while transactions that access this data are in progress. Data can be arbitrarily replicated, and the replication protocol is independent of the transaction protocol. Read and write operations may utilize a directory or similar mechanism to locate the data, which is true with or without transactions.

In various embodiments, no limits need necessarily be placed on the number of items that can be read and written during a transaction, and little performance impact may result from large read sets and or large write sets. A large read set means that more timestamps need to be updated and checked during the validation process for a read-write transaction. These updates and checks may be performed in parallel in some embodiments, and hence the performance may be determined by the slowest straggler or the farthest storage node if the items are geo-distributed. A larger read set may also make it more likely that one of the checks will fail, causing the transaction to abort. Large write sets may have similar issues. The commit timestamps on items in the write set may be updated in parallel in at least some embodiments, and the performance may depend on the slowest storage node. Thus, the commit latency may increase only slightly with larger write sets. A larger write set may make it more likely that some other transaction has committed a later version for one of the items, thereby necessitating a retry with a later commit time.

In at least some embodiments, no time constraints may be placed on scanning the transaction log/write set and applying the writes to the data store, though delayed writes may cause readers to wait. With a single-version store, if two transactions are applying committed writes at the same time, the DMS may follow a "last committer" policy. The data and its commit timestamp may be updated with a conditional write that ensures monotonicity of commit timestamps. If a write fails because its commit time is old, it may be ignored since another transaction has already written a newer value. With a multi-version store, new versions may have already been created with a pre-commit timestamp. Different transactions may be responsible for writing the values of their own versions. It may thus be acceptable okay for a later version to be written before an earlier one.

If an application fails after starting a transaction and possibly performing some reads and writes, the DMS may automatically abort the transaction after some time in various embodiments. The transaction's log (write set) and state in the transaction table may be the only metadata that has to be reclaimed, as with any transaction mechanism. This garbage collection may be done lazily in at least some embodiments since the aborted transaction does not affect other transactions. One of the advantages of timestamp ordering is that no timestamp updates ever need to be undone (unlike a locking scheme where acquired locks must be released). While a failed transaction may have unnecessarily advanced the read timestamps on some items, this does not present a problem. If a transaction coordinator fails during the multi-phase commit process but before changing the transaction state to committed, then pre-commit timestamps may have been written for transactions that will never commit. This also does not a problem since future transactions will choose later commit times. The main issue in a multi-version store may be that a version may have been created whose data will not be written. When versions with pre-commit timestamps are not written shortly, the DMS may check that the transaction was aborted (or force the transaction to abort) and remove its pre-committed versions from the data store in some embodiments. Note that if a transaction's coordinator fails after setting the transaction's status to committed, then all of the timestamp and versioning metadata remains valid in at least some embodiments. A recovery process may be required to roll forward the committed transaction by ensuring that the data items get written in such scenarios.

In embodiments in which versions of DMS data items are assumed to be immutable, they may easily be cached on clients and/or at various DMS. The main concern about reading an item from a cache may be that the cached version may be stale or, more generally, may be the incorrect version for a given start time. Since a read-write transaction has its read set validated when it attempts to commit, allowing it to read stale data is not a correctness issue. Read-only transactions may also read cached data if they perform a validation process during commit. However, reading from a cache may cause the transaction to be aborted if any stale or incorrect versions were actually read. The DMS may be designed or configured to take this chance to improve read performance. In some embodiments, a policy indicating whether cached data item reads are permitted or not may be specified by a DMS client.

To support read-only transactions without requiring validation, each cached version of an item may be associated with two timestamps in some implementations: the version's commit timestamp and a minimum time for the next higher version's commit timestamp or actual commit time if known. If a client reads a version that is older than the latest version, then the next higher commit timestamp will be known at the time of the read and cached with the item. When reading the latest version for which there is no next higher commit time, the next version's minimum commit timestamp is the same value as the version's commit timestamp initially, but it may be adjusted as new information is learned. Given a start time, a cached version of the item being read may be returned as the read result in some embodiments if the start time is after (or equal to) the cached version's commit timestamp and earlier than the next version's commit timestamp. If this condition does not hold, then the item may have to be read directly from an authoritative storage node rather than the cache. Another option employed for both read-only and read-write transactions in some embodiments may involve fetching updated timestamp information directly from a timestamp service. This may be done in the same operation as updating the read timestamp for an item, and may be faster than retrieving the contents of the item, especially for large items. The timestamp server may be presented with the commit timestamp of the cached version, and it may respond with the commit timestamp of the next higher version if one exists or the item's read timestamp if the cached version is currently the latest version. Note that even outdated timestamp information may be useful for caching purposes in some embodiments. The commit or start timestamp that is received may be set as the next version's minimum commit timestamp on the cached item, ensuring that this value is monotonically increasing. With the updated timestamps, the reader may re-check whether the cached version can satisfy its read request. If not, then the item may have to be read from the data store, the same as for a cache miss.

This "check on use" caching scheme may have the benefit that it can reduce the load on storage nodes (when they are distinct from timestamp servers) and provide a faster read response. But it may add additional delay when cache entries are not readable even after fetching updated information. If read latency is the primary concern, requests may be sent to the timestamp service and data store in parallel in some embodiments. The timestamp server is likely to respond more quickly since it has less data to return and probably has cached in its memory the timestamp information for frequently accessed keys. Also, the timestamp server may have data replicated in the local region while the data itself may be stored in a remote region in some cases. If the cached version is determined to be suitable, then the reader need not wait for the response from the storage node.

Figure 5A:
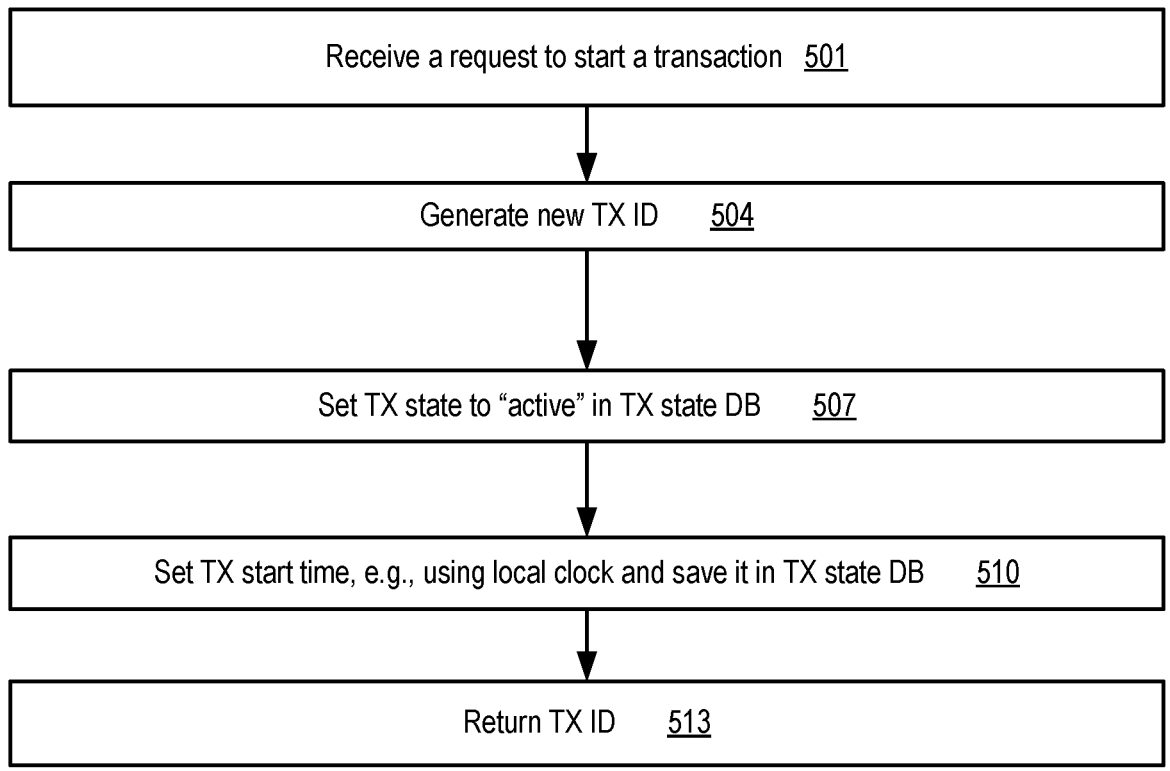
FIG. 5a is a flow diagram illustrating aspects of operations which may be performed to start a transaction at a data management service at which lock-free timestamp ordering based concurrency control is used, according to at least some embodiments.

FIG. 5a is a flow diagram illustrating aspects of operations which may be performed to start a transaction at a data management service at which lock-free timestamp ordering based concurrency control is used, according to at least some embodiments. The operations of FIG. 5a correspond to pseudocode section PS1 shown below. Note that the pseudocode examples provided below with respect to the flow diagrams of FIG. 5a, FIG. 6a, FIG. 6a, FIG. 6b, FIG. 7, and FIG. 8 indicate operations that may be performed at a multi-version DMS, and that some implementation details such as dealing with failures, replication, caching, and garbage collection are not included in the flow diagrams or the pseudo-code.

Start Pseudo-Code Section PS1
    TX_start( ) returns txid=
        1. txid=Guid.New( )
        2. txState[txid].status=active
        3. txState[txid].startTime=Clock.Now( )
        4. return txid
End Pseudo-Code Section PS1

As shown in element 501, a request to start a transaction may be received, e.g., at a transaction coordinator node of a data management service similar to DMS 102 of FIG. 1. A new transaction identifier may be generated (element 504 and line 1 of PS1). The status of the new transaction may be set to "active" in a transaction state database (element 507 and line 2 of PS1). The start time of the transaction may be set, e.g., using a local clock of the transaction coordinator, and saved as part of the transaction state (element 510 and line 3 of PS1) in the depicted embodiment. The transaction identifier may be returned to the requester (element 513 and line 4 of PS1).

Figure 5B:
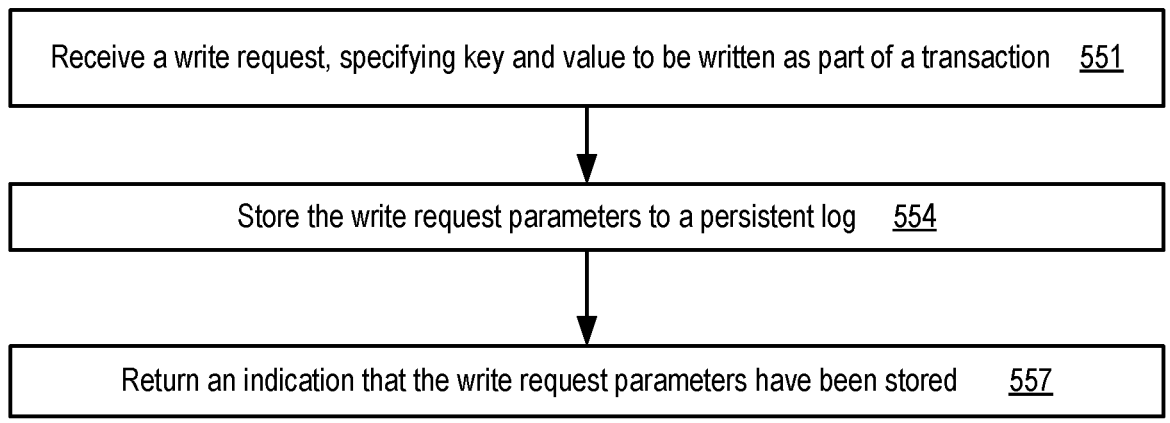
FIG. 5b is a flow diagram illustrating aspects of operations which may be performed to respond to a write request at a data management service at which lock-free timestamp ordering based concurrency control is used, according to at least some embodiments.

FIG. 5b is a flow diagram illustrating aspects of operations which may be performed to respond to a write request at a data management service at which lock-free timestamp ordering based concurrency control is used, according to at least some embodiments. The operations of FIG. 5b correspond to pseudocode section PS2 shown below. Write sets of transactions are assumed to be stored in a persistent log in the pseudocode, with entries for each written data item indexed by the transaction identifier. Individual data items are assumed to be stored within tables, with item keys unique within tables (but not necessarily unique across tables). Each table is assumed to have a unique name or identifier; thus, a given data item is fully identified by the combination of (table identifier, key)

Start Pseudo-Code Section PS2
    Write(txid, table, key, value)
        1. txState[txid].log+=<"write", table, key, value>
        2. return ok End Pseudo-Code Section PS2

As shown in element 551 of FIG. 5b, a write request specifying a data item key (which may include a table identifier) and a value to be written as part of a transaction with a specified transaction identifier may be received. The parameters of the write request may be written to a persistent log (element 554 and line 1 of PS2). An indication that the write parameters have been accepted and stored may be transmitted to the requester of the write (element 557 and line 2 of PS2). Note that the value to be written is only stored in the write set, and not actually applied to the data item at the time of the write request in the embodiment depicted in FIG. 5b.

Figure 6A:
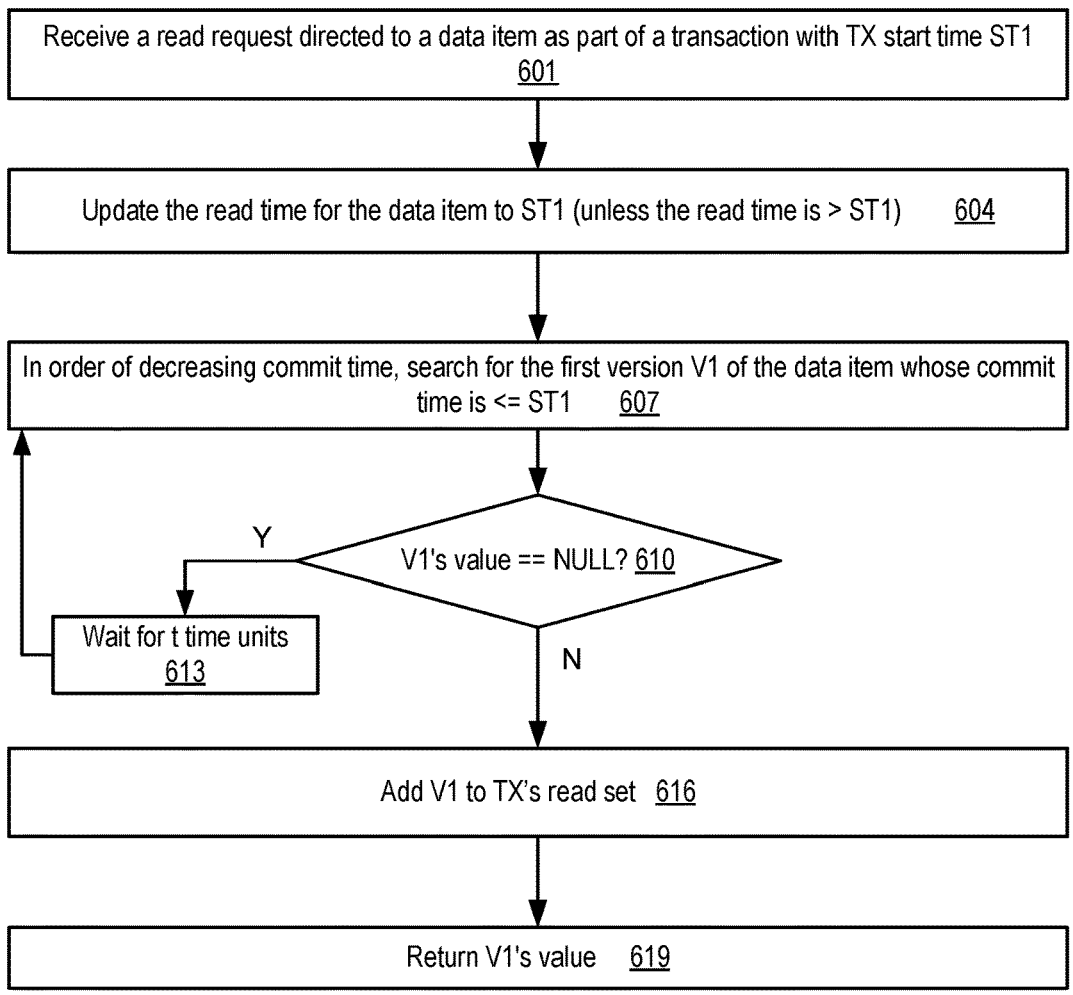
FIG. 6a is a flow diagram illustrating aspects of operations which may be performed to respond to a read request at a data management service at which lock-free timestamp ordering based concurrency control is used, according to at least some embodiments.

FIG. 6a is a flow diagram illustrating aspects of operations which may be performed to respond to a read request at a data management service at which lock-free timestamp ordering based concurrency control is used, according to at least some embodiments. The operations of FIG. 6a correspond to pseudocode section PS3 shown below. A timestamp store referred to as "timeStore" is assumed to be used for certain timestamps in the pseudocode, while values of the data items are assumed to be stored in a data store referred to as "datastore."

Start Pseudo-Code Section PS3
Read(txid, table, key) returns value
   1.    timeStore[table,key].readTime=max(timeStore [table,key].readTime, txState[txid].startTime)
   2. for each version in dataStore[table,key] sorted by decreasing commitTime
     a. if version.commitTime<=txState[txid].startTime break
   3. if version.value==NULL
     a. wait t units of time
     b. go to step 2
   4. txState[txid].readSet+=version
   5. return version.value
End Pseudo-Code Section PS3

As shown in element 601 of FIG. 6a, a read request directed to a data item as part of a transaction with transaction start time ST1 (txState[txid].startTime in the pseudocode) may be received. The read time for the data item may be updated to ST1 (unless the read time is already greater than ST1) (element 604 and line 1 of PS3). In order of decreasing commit times, a search may be conducted for the first version V1 of the data item whose commit time is <=ST1 (element 607, line 2 of PS3) in the depicted embodiment. It may be the case that the value contained in the version V1 identified in the search is currently null (e.g., because the value has not yet been propagated to the data store, even though the commit time that led to the selection of V1 has been stored). If V1's value is null (as detected in element 610 and line 3 of PS1), further processing of the read request may be delayed by t time units (element 613, lines 3a and 3b of PS3). The version search may be re-conducted, with additional delays of t time units between each search, until a non-null value has been found in the depicted embodiment. In some embodiments, if a non-null value has not been found in n attempts, an error may be returned to the requester. Assuming a version V1 which meets the timestamp criterion corresponding to element 607 is eventually found, the version V1 may be added to the transaction's read set (element 616 and line 4 of PS3) in the embodiment shown in FIG. 6a. The value portion of V1 may then be returned to the read requester (element 619, line 5 of PS3).

Figure 6B:
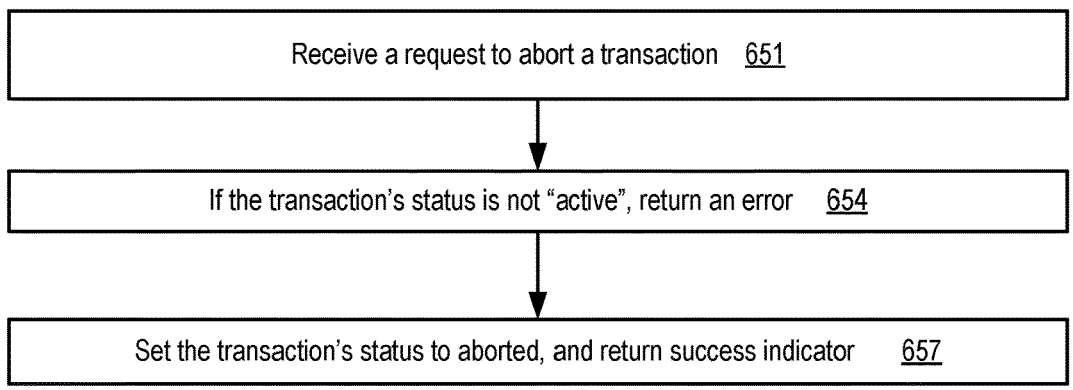
FIG. 6b is a flow diagram illustrating aspects of operations which may be performed to respond to a transaction abort request at a data management service at which lock-free timestamp ordering based concurrency control is used, according to at least some embodiments.

FIG. 6b is a flow diagram illustrating aspects of operations which may be performed to respond to a transaction abort request at a data management service at which lock-free timestamp ordering based concurrency control is used, according to at least some embodiments. The operations of FIG. 6b correspond to pseudocode section PS4 shown below.

Start Pseudo-Code Section PS4
   Abort(txid)=
     1. if (txState[txid].status!=active return error
     2. txState[txid].status=aborted
     3. return ok
End Pseudo-Code Section PS4

As shown in element 651 of FIG. 6b, a request to abort a transaction with a specified transaction identifier may be received, e.g., at a transaction coordinator of the kind shown in FIG. 1. If the transaction's current status is not active, an error may be returned in the depicted embodiment (e.g., because transactions cannot be aborted multiple times, and because committed transactions cannot be aborted) (element 654, line 1 of PS4). If the transaction's current status is active, the transaction's status may be set to aborted, and a success indicator may be returned to the requester in the depicted embodiment (element 657, lines 2 and 3 of PS4). In some embodiments, if an abort request is received for a transaction that is already has an aborted status, the request may simply be ignored instead of returning an error.

Figure 7:
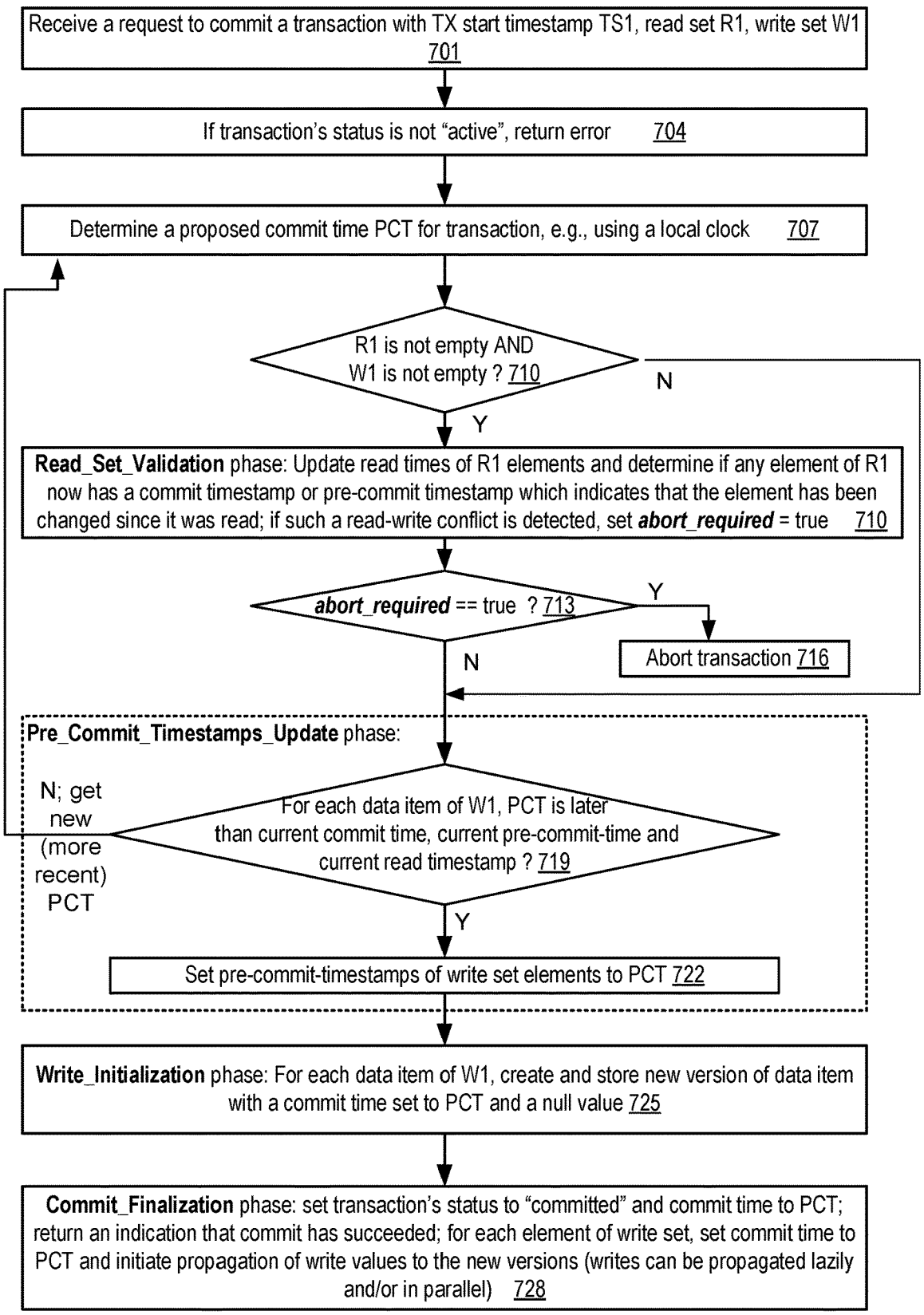
FIG. 7 is a flow diagram illustrating aspects of operations which may be performed to respond to a transaction commit request at a data management service at which lock-free timestamp ordering based concurrency control is used, according to at least some embodiments.

FIG. 7 is a flow diagram illustrating aspects of operations which may be performed to respond to a transaction commit request at a data management service at which lock-free timestamp ordering based concurrency control is used, according to at least some embodiments. The operations of FIG. 7 correspond to pseudocode section PS5 shown below. The commit may be implemented in multiple phases in the embodiment depicted in FIG. 7.

---------Start pseudo-code section PS5---------------------------------------
Commit(txid) =
   1. if (txState[txid].status != active return error
   2. proposedCommitTime = max(Clock.Now( ), txState[txid].startTime)
   3. if txState[txid].readSet != empty and txState[txid].log != empty
// this means that the transaction includes both reads and writes
// read set-validation phase begins
     a. validated = true
     b. for each read in txState[txid].readSet
// update read times of read set data items
       (i) timeStore[read.table,read.key].readTime =
         max(timeStore[read.table,read.key].readTime,
         proposedCommitTime)
// validate that read set data items have not been overwritten since the
// committing transaction started, i.e., that a read-write conflict hasn't occurred
       (ii) if read.commitTime != timeStore[read.table,read.key].commitTime
        or
        read.commitTime != timeStore[read.table,read.key].preCommitTime

```
        validated = false
// if the transaction included SQL queries or scans of tables, update the tables' read times
// and validate the table queries/scans
    c. for each table in txState[txid].readSet
        (i) timeStore[table].readTime = max(timeStore[table].readTime,
            proposedCommitTime)
        (ii) if txState[txid].startTime < max(timeStore[table,*].commitTime)
        or
        txState[txid].startTime < max(timeStore[table,*].preCommitTime)
            validated = false
// read set-validation phase ends; if validated == false, abort the transaction
    d. if validated == false
        i. txState[txid].status = aborted
        ii. return aborted
// update-pre-commit-timestamps phase begins
    4. for each write in txState[txid].log
        a. if (proposedCommitTime > timeStore[write.table,write.key].commitTime
            and
            proposedCommitTime > timeStore[write.table,write.key].preCommitTime
            and
            proposedCommitTime > timeStore[write.table,write.key].readTime
            and
            proposedCommitTime > timeStore[write.table].readTime)
            ok = timeStore[write.table,write.key].preCommitTime = proposedCommitTime
        b. if not ok go to step 2 // get new proposed commit time
// update-pre-commit-timestamps phase ends; write-initialization phase begins
    5. for each write in txState[txid].log
        a. newVersion.key = write.key
        b. newVersion.commitTime = proposedCommitTime
        c. newVersion. value = null
        d. dataStore[write.table,write.key] += newVersion
// write-initialization phase ends; commit-finalization phase begins
    6. txState[txid].status = committed
    7. txState[txid].commitTime = proposedCommitTime
    8. for each write in txState[txid].log
        a. if timeStore[write.table,write.key].commitTime < txState[txid].commitTime
            timeStore[write.table,write.key].commitTime = txState[txid].commitTime
// the following writes can be applied lazily/asynchronously/in-parallel
        b. for each version in datastore[write.table,write.key]
            if version.commitTime == txState[txid].commitTime
                version.value = write.value
    9. return ok
---------End pseudo-code section PS5---------------------------------------------
```

As shown in element 701, a request to commit a transaction with a transaction start timestamp TS1, read set R1 and write set W1 may be received, e.g., at a transaction coordinator of a DMS similar to DMS 102 of FIG. 1. The transaction's identifier may be included in the commit request, which may be used to look up the start timestamp, read set and write set in some embodiments. If the transaction's current status is not active, an error may be returned (element 704, line 1 of PS5) in the depicted embodiment. A proposed commit time PCT may be determined for the transaction, e.g., using a local clock of the transaction coordinator in various embodiments (element 707, line 2 of PS5).

If R1 and W1 are both non-empty, indicating that the transaction included both reads and writes, a read set validation phase of the multi-phase commit may be initiated (element 710, line 3 of PS5) in the depicted embodiment. If the transaction was read-only, the read set validation may not be required, as the read values may have been selected based on the transaction's start time as discussed earlier. During the read set validation phase, the read times of the elements of R1 (individual data items that were read, as well as tables that were scanned or queried using range queries) may be updated to the proposed commit time (if the proposed commit time is later than the current read times), as indicated in the lines 3b(i) and 3c(i) of PS5. Note that read times for multiple read set elements may be updated at least partly in parallel in some embodiments. If the committing transaction had read a version of an individual data item of the read set other than the current committed version (indicated by the data item's current commitTime) or the version in the process of being committed (indicated by the data item's current preCommitTime) (as checked in line 3b(ii) of PS5) this would indicate that the value of that element has been overwritten since the read occurred, so the read would have to be considered invalid. Similarly, if any data item of a table in the read set (where the table was included in the read set as a result of query) has a commit time or pre-commit time later than the start time of the transaction (as checked in line 3c(ii)), the query result may no longer be valid. The variable "validated" in PS5 lines 3b(ii) and 3c(ii) is set to false if contents of any of the reads or table queries/scans have been overwritten, indicating that an abort is required (abort_required=true in element 710 of FIG. 7). If an abort is required (as determined in element 713 of FIG. 7 or line 3d of PS5), the transaction may be aborted (element 716 of FIG. 7, lines 3d(i) and 3d(ii) of PS5).

If the transaction does not need to be aborted because of a conflict found during the read set validation phase, a pre-commit-timestamps update phase may be initiated in various embodiments. In this phase, the transaction may determine whether the currently selected proposed commit time meets a set of timestamp-related criteria (element 719, and line 4a of PS5) which determine whether the transaction can eventually be committed with that proposed commit time set as the pre-commit timestamp and later as the actual commit time of the transaction. The timestamp-related criteria may include that the proposed commit time PCT is later than all of the following for each data item of the write set: the commit time, the pre-commit time, the read time and the parent table's read time. If the proposed commit time does not satisfy the criteria, a new proposed commit time may be chosen (element 707 of FIG. 7 and line 4b of PS5) and the read set validation may be repeated before retrying the update of the pre-commit timestamps. In some embodiments, to avoid scenarios in which the same transaction attempts to commit again and again with different proposed commit times, a parameter representing the maximum number of proposed commit times that can be tried by a given transaction before the transaction is aborted may be used. Such a parameter may be selected by a DMS client or by the DMS itself in different embodiments. When the criteria are satisfied (i.e., whether the criteria are satisfied with the very first PCT, or after one or more new PCTs are tried out), the pre-commit timestamps of the write set elements may be set to the PCT in various embodiments (element 722 and the end of line 4a of PS5). In some embodiments, a tuning parameter indicating the maximum number of times that a new proposed commit time is to be obtained and tried out may be set, e.g., based on input provided by a client of the DMS; if such a limit is reached, the transaction may be aborted in such an embodiment.

After the pre-commit timestamps update phase is complete, a write initialization phase of the multi-phase commit may be initiated in various embodiments. In the write initialization phase, new versions may be created and stored of each of the data items of the write set (element 725, and lines 5a-5d of PS5). The PCT may be set as the commit time of each new version, while the value may initially be set to null (that is, the values may not actually be written to the data store at this stage). Note that the commit times may be set at least partly in parallel for multiple items of the read set in some embodiments. The commit times of the new versions may later be used, along with the data item keys, to propagate or apply the values which were stored in the write set in the depicted embodiment.

In various embodiments, after the write initialization phase is completed, a commit finalization phase may be initiated. In this phase, the transaction's status may be set to committed, and the transaction's commit time may be set to the proposed commit time (PCT) (element 728, and lines 6 and 7 of PS5). An indication that the transaction has been successfully committed may be provided to the commit requester in some embodiments at this stage, even though the values indicated for the data items in the write set may not yet have been applied. For each write of the write set, if the commit timestamp of the corresponding data item in the timestamp store is lower than the transaction's commit time, the data item's commit timestamp may be updated to the commit time of the transaction (line 8a of PS5) in the depicted embodiment. The values of the data items of the write set may be applied (line 8b of PS5) at this stage in some embodiments. Note that the values may be applied or propagated in parallel for multiple data items of the write set, and may be applied lazily (i.e., after the commit success result has been provided to the commit requester) in at least some embodiments.

Figure 8:
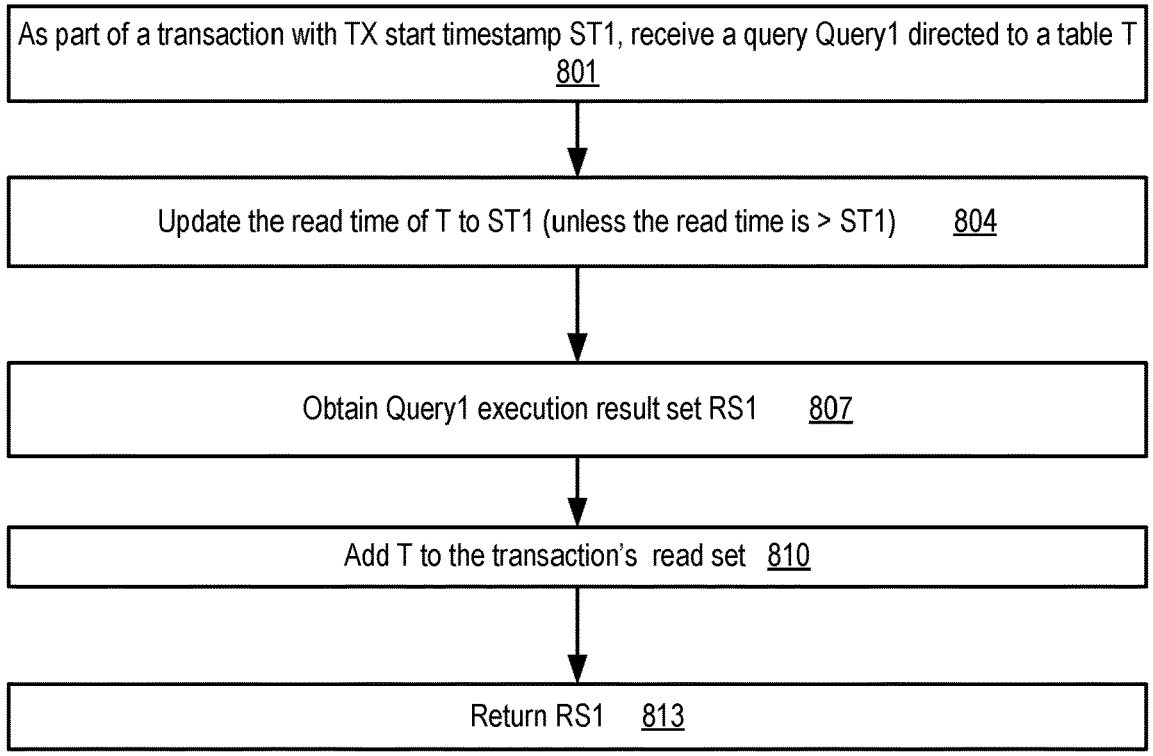
FIG. 8 is a flow diagram illustrating aspects of operations which may be performed to respond to an SQL (Structured Query Language) style query directed to a table at a data management service at which lock-free timestamp ordering based concurrency control is used, according to at least some embodiments.

FIG. 8 is a flow diagram illustrating aspects of operations which may be performed to respond to an SQL (Structured Query Language) style query directed to a table at a data management service at which lock-free timestamp ordering based concurrency control is used, according to at least some embodiments. The operations of FIG. 8 correspond to pseudocode section PS6 shown below.

Processing a SQL-style query (i.e., a query using syntax and semantics similar to those used in various versions of SQL and its variants) with a WHERE clause may often involves scanning a range of keys, rather than simply fetching individual data items. A transaction system must ensure that concurrent writers do not insert new items into this range with an earlier commit time than the transaction that performed the query. A traditional database might employ range locks, index locks, or page locks for this purpose. With the timestamp ordering based techniques introduced herein, range timestamps may be used as an additional type of read timestamp in some embodiments. That is, a read timestamp may be associated with each range over which a scan is performed. This read timestamp may be updated with the start time of the transaction that executes the query performing the scan. When a write transaction commits, it must choose a commit time that is not only after any read timestamps for the items that are being written but also after any range timestamps for ranges that include the keys of new items being written. Since queries may have arbitrary clauses that require scanning different ranges of keys, the set of possible range timestamps could be unbounded. Consequently, storing and checking large sets of range timestamps could be burdensome. A viable simplification, employed in the embodiment shown in FIG. 8 and in several of the pseudo-code sections, is to maintain one read timestamp for the table as a whole. (Such a table-level read timestamp was also illustrated in FIG. 2). This single timestamp may be updated whenever a query is performed by a read-only transaction, and may be is checked whenever a transaction includes writes to the table.

Start Pseudo-Code Section PS6
    Query(txid, table, sqlString)=
      1.    timeStore[table].readTime=max(timeStore[table].readTime, txState[txid].startTime)
      2. RS1=dataStore. Query(table, sql, txState[txid].startTime)
      3. txState[txid].readSet+=table
      4. return RS1
End Pseudo-Code Section PS6

As shown in element 801 of FIG. 8, an SQL style query Query1 (represented as an SQL string sqlString in PS6) directed to a particular table T may be received at a DMS, e.g., as part of a transaction with a start timestamp ST1. The read time of T may be updated to ST1 (unless the read time is greater than ST1 already) in various embodiments (element 804, line 1 of PS6). Query1 may be executed against table T, obtaining a result set RS1 (element 807, line 2 of PS6). In scenarios in which older versions of data items are retained indefinitely, appropriate values of the data items may always be found; if older versions are being discarded, it may be that the query doesn't succeed and is aborted. If a result set is obtained successfully, the table T may be added to the read set of the transaction (element 810, line 3 of PS6) and the result set may be returned to the submitter of Query 1 (element 813, line 4 of PS6).

It is noted that in various embodiments, some of the operations shown in the flow diagrams of FIG. 5*a*, FIG. 5*b*, FIG. 6*a*, FIG. 6*b*, FIG. 7 and/or FIG. 8 may be implemented in a different order than that shown in the figure, or may be performed in parallel rather than sequentially. Additionally, some of the operations shown in one or more of these flow diagrams may not be required in one or more implementations.

Figure 9:
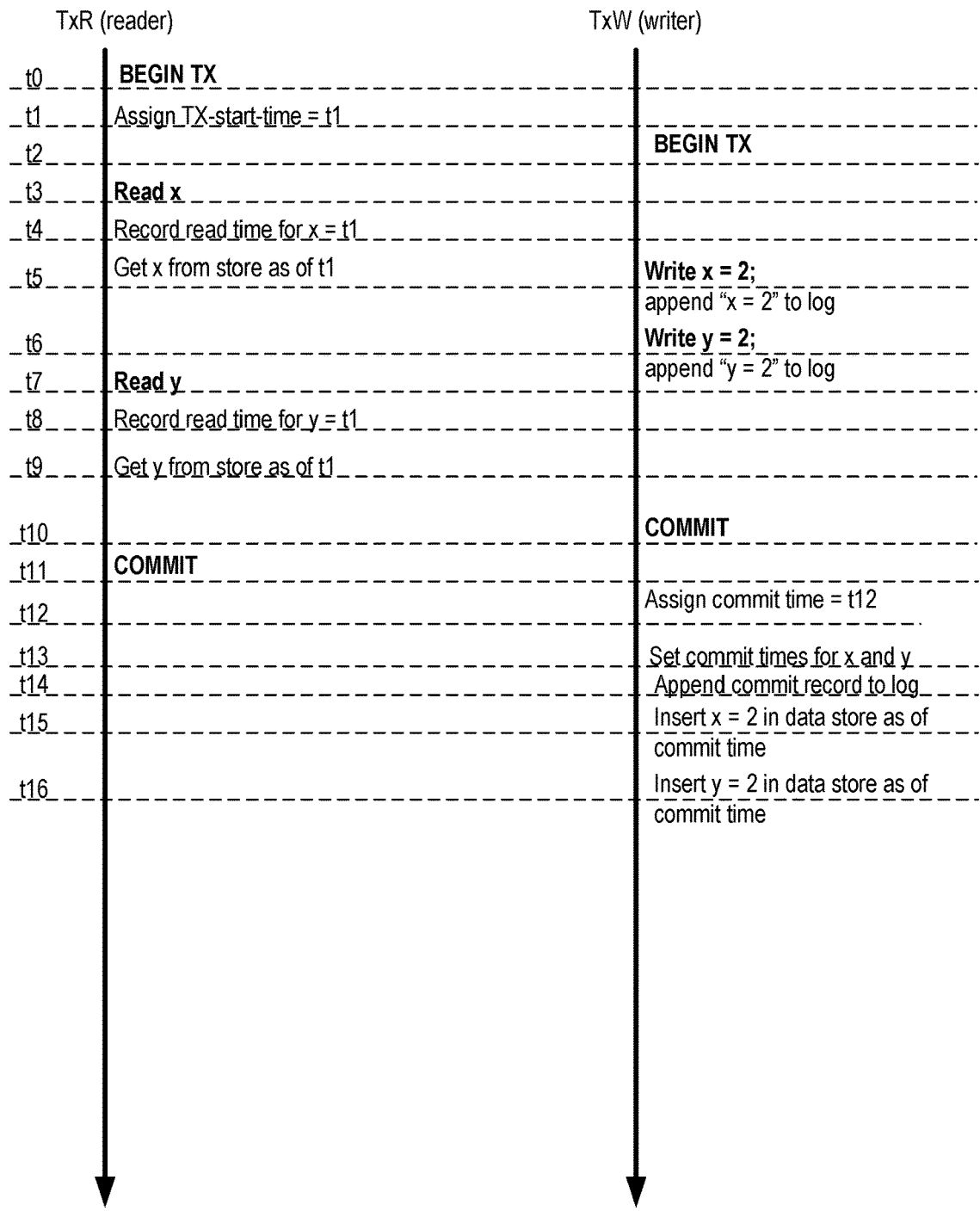
FIG. 9 illustrates an example sequence of events when executions of a reader transaction and a writer transaction directed to the same set of data items overlap in time at a data management service at which lock-free timestamp ordering based concurrency control is used, according to at least some embodiments.
Figure 10:
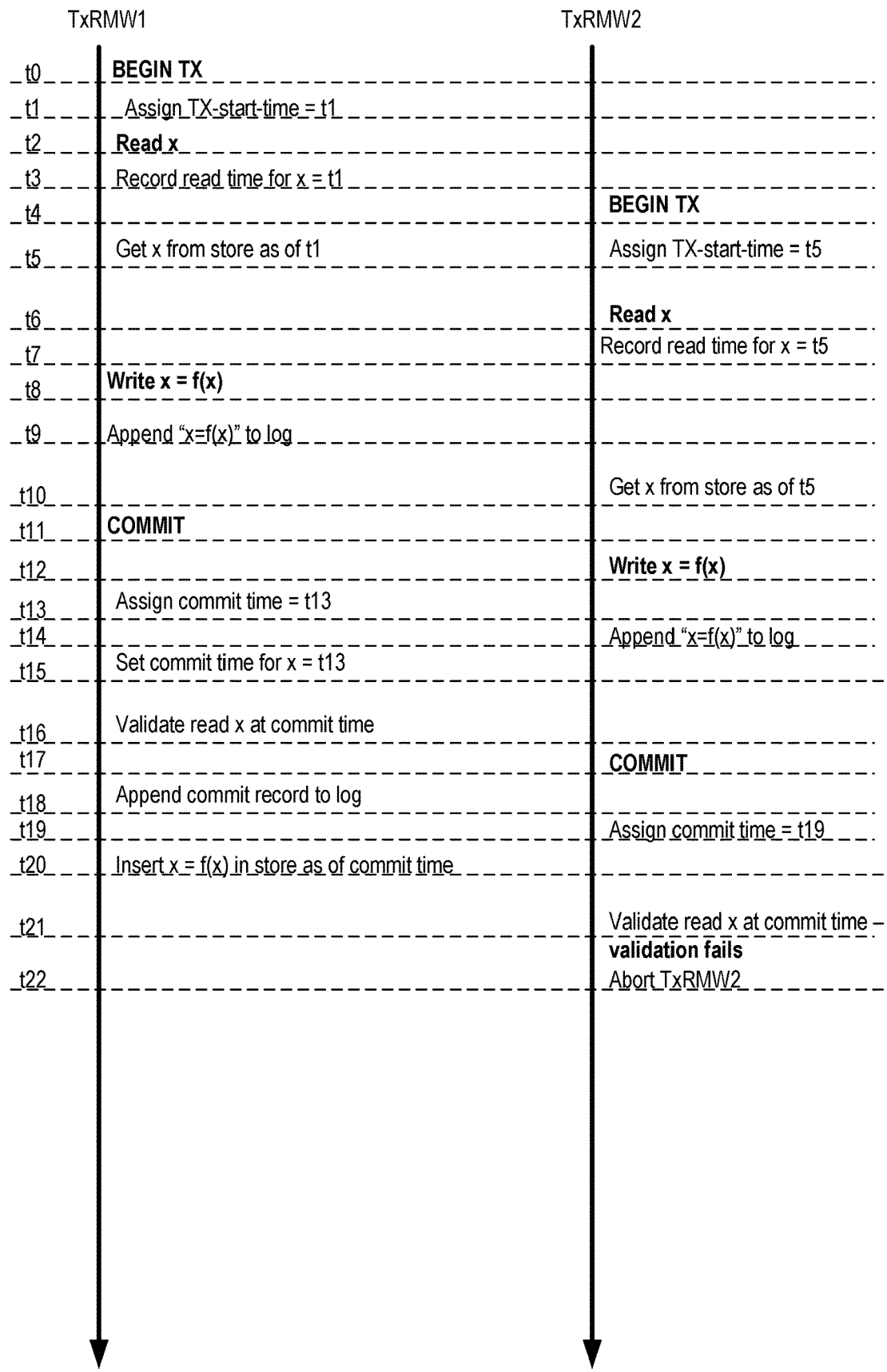
FIG. 10 illustrates an example sequence of events when executions of a pair of read-modify-write transactions directed to the same data item overlap in time at a data management service at which lock-free timestamp ordering based concurrency control is used, according to at least some embodiments.
Figure 11:
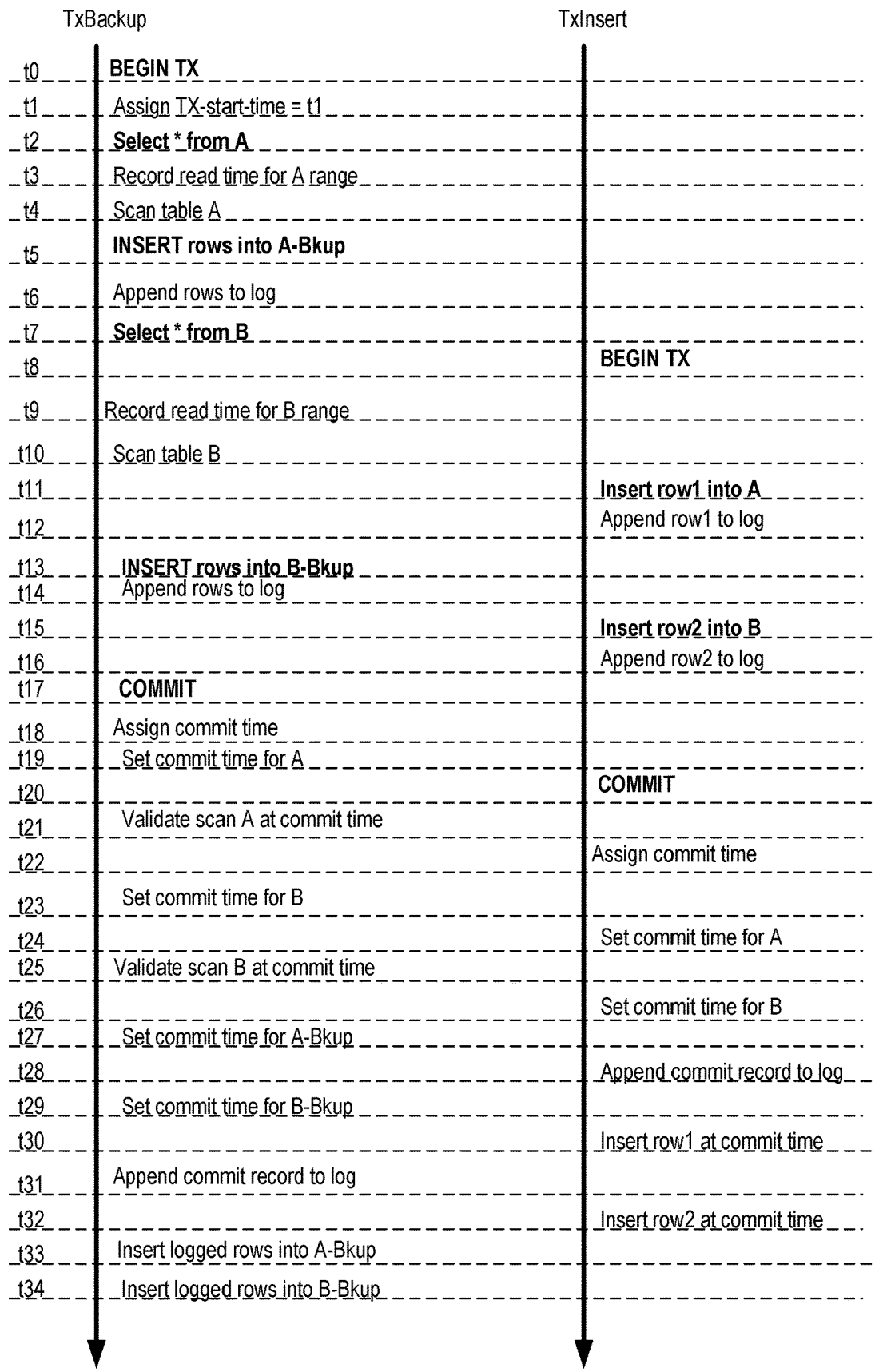
FIG. 11 illustrates an example sequence of events associated with a range query at a data management service at which lock-free timestamp ordering based concurrency control is used, according to at least some embodiments.

FIG. 9 illustrates an example sequence of events when executions of a reader transaction and a writer transaction directed to the same set of data items overlap in time at a data management service at which lock-free timestamp ordering based concurrency control is used, according to at least some embodiments. Time values increase from the top towards the bottom in timelines indicating events of the reader transaction (TxR) and the write transaction (TxW) in the example scenario depicted in FIG. 9. Note that the successive time values shown (t0, t1, etc.) of FIG. 9, FIG. 10 and FIG. 11 are shown only to indicate relative sequencing of example events, and not the magnitudes of differences in time between any given pair of events. The successive time values may only differ from one another by very small amounts (e.g., a few milliseconds or even a few microseconds) in some cases. For the purpose of explaining the concepts involved, a global set of unique time values is shown in the timelines, even though the actual timestamps may be obtained from unsynchronized local clocks at various devices of the DMS in at least some embodiments. The set of events shown in FIG. 9, FIG. 10 and FIG. 11 is not comprehensive; some events, which are not relevant to the concepts being illustrated by example, are not included.

With multi-versioning and timestamp ordering of the kind introduced above, the two transactions can execute independently since TxR can read older items while TxW's writes produce new versions of the same items. TxR begins at time t0, with a start time t1 being assigned to TxR. TxR reads a data item with key x at t2, recording x's read time as t1 (TxR's start time) and retrieving the version of x which was valid as of t1 from the DMS's data store at time t5. Later, TxR reads y at t7, sets the same read time for y as was set for a, and reads y from the data store at t9. At t11, TxR commits. TxW begins at t2, and a write setting x=2 is recorded in the transaction log of TxW at t5. (The start time of TxW may is not relevant to the discussion, and so is not shown.) At t6, another write, setting y=2 is also recorded in the transaction log of TxW. A commit request for TxW is received at t10 (before TxR's commit request). A commit time of t12 is assigned to TxW, and new commit times for x and y are set at t13. A commit record of TxW is appended to a persistent transaction state store at t14. The updated values of x and y are inserted into the DMS's data store as of the commit time t12 at t15 and t16.

Because the start time of TxR is earlier than the commit time for TxW, both reads initiated by TxR return the older versions of both items (i.e., older than those written as a result of TxW). Even if there were a considerable delay between the two reads of TxR such that the first read happened before TxW commits and the second read happens after TxW's commit, transaction TxR would still perform both reads from a consistent snapshot as of TxR's start time in the depicted embodiment.

FIG. 10 illustrates an example sequence of events when executions of a pair of read-modify-write transactions directed to the same data item overlap in time at a data management service at which lock-free timestamp ordering based concurrency control is used, according to at least some embodiments. Timestamp ordering can prevent incorrect results when such concurrent transactions are performing read-modify-write sequences on the same item. With timestamp ordering, the concurrent reads of the two read modify write (TxRMW1 and TxRMW2 in FIG. 10) would be allowed and the first transaction of the two to commit would successfully complete its write. The second transaction that tries to commit would check whether the value it previously read is the same as the current value as of its chosen commit time, and this validation would fail, resulting in this second transaction being aborted as indicated in FIG. 10.

TxRMW1 starts at t0 and is assigned a start time t1 along the timelines of events shown in FIG. 10. TxRMW1 reads data item x at t2, recording x's read time as TxRMW1's start time t1 at t3. At t5, the value of x as of t1 is read from the DMS's data store. At t8, a write of x=f(x) is initiated, and the write parameters are appended to the write set of TxRMW1 at t9. At t11, a commit of TxRMw1 is requested. A commit time of t13 is assigned to TxRMW1, and at t15, the commit time of x is set to t13 as well. At t16, the earlier read of x is validated successfully, so there is no need to abort TxRMW1. Note that in some implementations, the validation of the read of x may be performed prior to setting the commit time for x. A commit record for TxRMW1 is appended to the transaction state store at t18, and the new value of x is eventually written to the data store as of the commit time at t20.

TxRMW2 starts at t4 and is assigned a start time t5. TxRMW2 reads data item x at t6, recording x's read time as TxRMW2's start time t5 at t7. At t10, the value of x as of t5 is read from the DMS's data store. At t12, a write of x=f(x) is initiated from TxRMW2, and the write parameters are appended to the write set of TxRMW2 at t14. At t17, a commit of TxRMW2 is requested. A commit time of t19 is assigned to TxRMW2. At t21, the commit time of x is set to t19. However, the attempt to validate the TxRMW2's read of x fails at t21, since x has a commit time of t13 (due to TxRMW1's write), and t13 exceeds TxRMW2's start time of t5. Accordingly, TxRMW2 is aborted at t22.

FIG. 11 illustrates an example sequence of events associated with a range query at a data management service at which lock-free timestamp ordering based concurrency control is used, according to at least some embodiments. The sequence of events shown in FIG. 11 illustrates one scenario in which table-level timestamps of the kind shown in FIG. 2 may be useful. In the depicted scenario, two tables A and B are stored at a DMS similar to DMS 102 of FIG. 1. Each item in table A is assumed to have a corresponding item in table B with a foreign key relationship. Suppose that a transaction TxBackup takes a backup of these two tables by copying all their rows into other tables as follows:

TxBackup=BEGIN
rows=SELECT * FROM A
INSERT rows INTO A-Bkup
rows=SELECT * FROM B
INSERT rows INTO B-Bkup
COMMIT Also suppose that a concurrent transaction TxInsert adds new rows to these two tables while a backup is being performed as follows TxInsert=BEGIN
INSERT row1 INTO A
INSERT row2 INTO B
COMMIT Without concurrency control, transaction TxBackup could copy the rows from table A into its backup table, then TxInsert could insert new rows into tables A and B, and then rows from table B could be copied into the backup for table B. Table B's backup would include the new row that was added while table A's backup excludes its new row. Thus, the backups would not be transactionally consistent. Restoring the tables from this backup would result in the foreign key constraint being violated since table B would end up with a row that has no correspondence in table A.

TxBackup begins at t1, and is assigned a start time at t1. The selection of all rows of A is requested at t2, with the read time for the A range (the entire table A) being set at t3 to t1, and table A being scanned at t4. The insert request for A-Bkup is issued at t5, and the rows are appended to the write set of TxBackup at t6. The selection of all rows of B is requested at t7, with the read time for the B range (the entire table B) being set at t9 to t1, and table B being scanned at t10. The insert request for B-Bkup is issued at t13, and the rows are appended to the write set of TxBackup at t14. A commit request for TxBackup is received at t17, with commit time t18 being assigned to TxBackup. The commit times for A, B, A-Bkup and B-Bkup are set to t18 at t19, t23, t27 and t29. The two scans are validated successfully at t21 and t25, as none of the rows of A or B have writes that have been committed after TxBackup's start time of t1. A commit record for TxBackup is written to the transaction state store or log at t31, and the logged rows are written to A-Bkup and B-Bkup at t33 and t34.

TxInsert begins at t8. A request to insert Row1 into A is obtained at t11, with an entry for the insert being appended into the write set log at t12. A request to insert Row2 into B is obtained at t15, with an entry for the insert being appended into the write set log at t16. A commit request for TxInsert arrives at the DMS at t20, and the commit time for TxInsert is set to t22 (this is after the commit time, t18, of TxBackup). The commit times for A (because of on insert of row1) and B (because of the insert of row2) can be set to TxInsert's commit time at t24 and t26. A commit record for TxInsert is written to persistent storage at t28. Row1 and row2 are inserted into the DMS at t30 and t32 respectively.

With timestamp ordering, the concurrent TxInsert transaction must commit with a later timestamp in order for TxBackup's validation to succeed as shown in FIG. 11. It is noted in FIG. 11 that transactions TxBackup and TxInsert are both able to commit their changes successfully even though they overlap considerably. However, if TxInsert's commit had occurred just a bit sooner causing it to be assigned an earlier commit time than that of TxBackup, then the TxBackup transaction would abort. The problem would be that the commit time for TxInsert would have been between the start time and commit time of TxBackup, and hence the scans performed earlier by TxBackup would no longer have been valid when TxBackup tries to commit.

Figure 12:
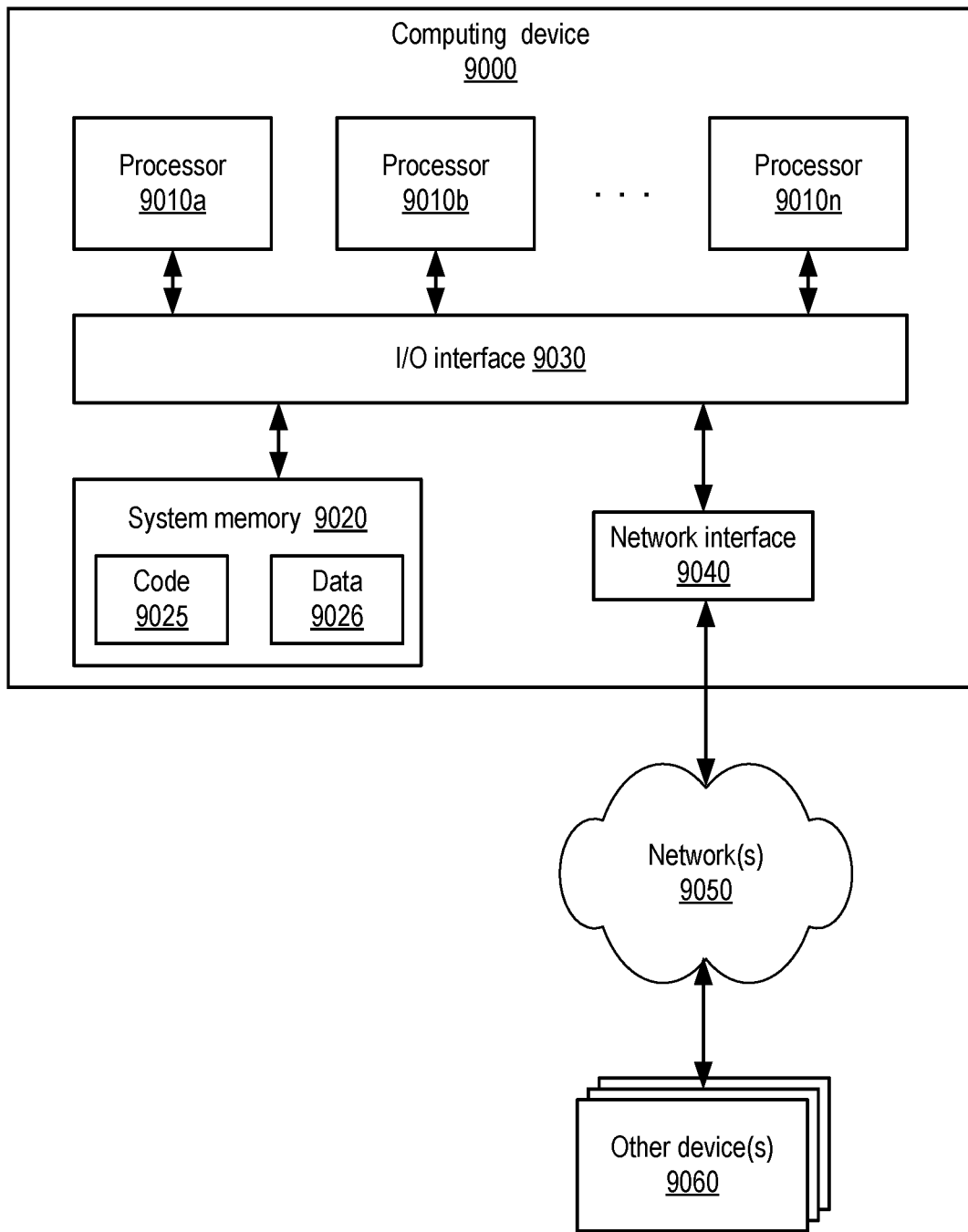
FIG. 12 is a block diagram illustrating an example computing device that may be used in at least some embodiments.

In at least some embodiments, a server that implements the types of techniques described herein (e.g., various functions of a DMS, a VCS and/or other services of a provider network), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multi-processor systems, each of processors 9010 may commonly, but not necessarily, implement the same ISA. In some implementations, graphics processing units (GPUs) and or field-programmable gate arrays (FPGAs) and/or other types of computation accelerators may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
obtain, at a transaction coordinator of a data management service of a provider network, a commit request for a particular transaction, wherein a read set of the particular transaction indicates one or more reads that were directed in the particular transaction to respective versions of one or more data items of an item collection, wherein the reads of the read set were performed without acquiring a lock, wherein a write set of the particular transaction indicates respective values to be written to one or more data items of the item collection, and wherein items of the item collection are distributed among a plurality of nodes of the data management service;
initiate, by the transaction coordinator in response to the commit request, a multi-phase commit of the particular transaction, wherein the multi-phase commit does not include acquisition of a lock, and wherein the multi-phase commit comprises at least:
a read set validation phase, in which a determination is made, using one or more timestamps including a pre-commit timestamp associated one or more data items of the read set, whether the particular transaction satisfies an abort requirement due to a read-write conflict;
a pre-commit timestamps update phase initiated in response to determining that the abort requirement is not satisfied, wherein, in the pre-commit timestamp update phase, respective pre-commit timestamps associated with individual data items of the write set are set to a proposed commit time of the particular transaction after verifying that the proposed commit time satisfies one or more timestamp-based conditions;
a write initialization phase during which respective new versions of individual data items of the write set are stored, wherein the respective new versions indicate the proposed commit time and do not contain the respective values indicated in the write set; and
a commit finalization phase in which a commit time of the particular transaction is set to the proposed commit time and written to persistent storage; and
provide, by the transaction coordinator after the commit finalization phase has been completed, an indication that the particular transaction has been committed.

2. The system as recited in claim 1, wherein the item collection comprises one or more tables, wherein individual ones of the tables comprise one or more data items, and wherein the one or more computing devices include further instructions that upon execution on or across the one or more computing devices:
store a respective read timestamp corresponding to individual ones of the tables, wherein a read timestamp of a particular table is set to a transaction start time of another transaction which includes a query directed to the particular table, wherein the particular table is included in a read set of the other transaction in response to the query, and wherein the read time of the particular table is utilized during a pre-commit timestamps update phase of a multi-phase commit of the other transaction.

3. The system as recited in claim 1, wherein the data management service comprises a set of data storage nodes and a set of timestamp storage nodes, wherein the one or more computing devices include further instructions that upon execution on or across the one or more computing devices:

store a version of a particular data item of the read set at a particular data storage node of the set of data storage nodes; and store a pre-commit timestamp associated with the particular data item at a particular timestamp storage node of the set of timestamp storage nodes.

4. The system as recited in claim 1, wherein the one or more computing devices include further instructions that upon execution on or across the one or more computing devices:

obtain, via one or more programmatic interfaces, respective values of one or more parameters for managing the item collection, wherein the one or more parameters include one or more of: (a) a maximum acceptable clock skew among nodes of the data management service, (b) a maximum acceptable difference between a clock time of a storage node and a commit time of a transaction which accessed a data item of the storage node, (c) a maximum number of proposed commit times to be tried for a transaction before the transaction is aborted, (d) a version deletion criterion for data items, (e) a proactive read timestamp advancement policy, (f) a policy for validating reads on commit, (g) a policy for using read timestamps for groups of data items, or (h) a policy for reading cached data items.

5. The system as recited in claim 1, wherein the one or more computing devices include further instructions that upon execution on or across the one or more computing devices:

providing, by the data management service via one or more programmatic interfaces, respective values of one or more metrics associated with managing the item collection, wherein the one or more metrics include one or more of: (a) transaction abort rates, (b) transaction commit rates, (c) commit request response times, (d) read set sizes, (e) write set sizes, (f) read-only transaction rates, or (g) average or maximum number of pre-commit timestamps obtained for a transaction.

6. A computer-implemented method, comprising:

initiating, at a lock-less data management service, a multi-phase commit of a particular transaction, wherein the multi-phase commit comprises at least:

a read set validation phase in which a determination is made, using a first set of timestamp-based conditions and a read set of the particular transaction, whether the particular transaction has a read-write conflict with another transaction;

a pre-commit timestamps update phase initiated in response to determining that the particular transaction does not have a read-write conflict, wherein, in the pre-commit timestamp update phase, respective pre-commit timestamps associated with individual data items of a write set of the particular transaction are set to a proposed commit time of the particular transaction after verifying that the proposed commit time satisfies a second set of timestamp-based conditions; and a write initialization phase during which respective new versions of individual data items of the write set are stored, wherein the respective new versions indicate the proposed commit time and do not contain data item values indicated in the write set; and providing, by the lock-less data management service after the multi-phase commit has been completed, an indication that the particular transaction has been committed.

7. The computer-implemented method as recited in claim 6, wherein the multi-phase commit further comprises:

a commit finalization phase in which a commit time of the particular transaction is set to the proposed commit time and written to persistent storage, wherein the commit finalization phase is initiated after the write initialization phase has completed.

8. The computer-implemented method as recited in claim 7, further comprising:

causing, after the commit finalization phase, one or more values indicated in the write set to be written to the respective new versions of individual data items of the write set.

9. The computer-implemented method as recited in claim 8, wherein at least one value of the one or more values is written to a new version of an individual data item after the indication that the particular transaction has been committed has been provided.

10. The computer-implemented method as recited in claim 8, wherein causing the one or more values indicated in the write set to be written comprises causing a plurality of values indicated in the write set to be written at least partly in parallel.

11. The computer-implemented method as recited in claim 6, wherein the lock-less data management service stores multiple versions of at least some data items, wherein a new version of a particular data item of the write set is stored without overwriting an older version of the particular data item.

12. The computer-implemented method as recited in claim 6, wherein the lock-less data management service comprises a plurality of nodes including one or more transaction coordinator nodes, the computer-implemented method further comprising:

obtaining, at a transaction coordinator node of the lock-less data management service, a commit request for the particular transaction, wherein the multi-phase commit is initiated in response to the commit request, wherein the proposed commit time is assigned by the transaction coordinator node, wherein the proposed commit time is based at least in part on a local clock accessible from the transaction coordinator node, and wherein the local clock accessible from the transaction coordinator node is not synchronized with local clocks accessible from other nodes of the lock-less data management service.

13. The computer-implemented method as recited in claim 6, further comprising:

obtaining, at the lock-less data management service via one or more programmatic interfaces, respective values of one or more parameters for managing a collection of data items of a client of the service, wherein the one or more parameters include one or more of: (a) a maximum acceptable clock skew among nodes of the lock-less data management service, (b) a maximum acceptable difference between a clock time of a storage node and a commit time of a transaction which accessed a data item of the storage node, (c) a maximum number of proposed commit times to be tried for a transaction before the transaction is aborted, (d) a version deletion criterion for data items, (e) a proactive read timestamp advancement policy, (f) a policy for validating reads on commit, (g) a policy for using read timestamps for groups of data items, or (h) a policy for reading cached data items.

14. The computer-implemented method as recited in claim 6, further comprising:
providing, by the lock-less data management service via one or more programmatic interfaces, respective values of one or more metrics associated with managing a collection of data items of a client, wherein the one or more metrics include one or more of: (a) transaction abort rates, (b) transaction commit rates, (c) commit request response times, (d) read set sizes, (e) write set sizes, (f) read-only transaction rates or (g) average or maximum number of pre-commit timestamps obtained for a transaction.

15. The computer-implemented method as recited in claim 6, wherein the lock-less data management service comprises a set of data storage nodes and a set of timestamp storage nodes, the computer-implemented method further comprising:
storing a value of a particular data item of the read set at a particular data storage node of the set of data storage nodes; and
storing a pre-commit timestamp associated with the particular data item at a particular timestamp storage node of the set of timestamp storage nodes.

16. One or more non-transitory computer-accessible storage media storing program instructions that when executed on or across one or more processors:
initiate, at a lock-free data management service, a multi-phase commit of a particular transaction, wherein the multi-phase commit comprises at least:
a read set validation phase in which a determination is made, using a first set of timestamp-based conditions and a read set of the particular transaction, whether the particular transaction has a read-write conflict with another transaction;
a pre-commit timestamps update phase initiated in response to determining that the particular transaction does not have a read-write conflict, wherein, in the pre-commit timestamp update phase, respective pre-commit timestamps associated with individual data items of a write set of the particular transaction are set to a proposed commit time of the particular transaction after verifying that the proposed commit time satisfies a second set of timestamp-based conditions; and
a write initialization phase during which respective new versions of individual data items of the write set are stored, wherein the respective new versions indicate the proposed commit time and do not contain data item values indicated in the write set; and
provide, by the lock-free data management service after the multi-phase commit has been completed, an indication that the particular transaction has been committed.

17. The one or more non-transitory computer-accessible storage media as recited in claim 16, wherein the multi-phase commit further comprises:
a commit finalization phase in which a commit time of the particular transaction is set to the proposed commit time and written to persistent storage, wherein the commit finalization phase is initiated after the write initialization phase has completed.

18. The one or more non-transitory computer-accessible storage media as recited in claim 17, storing further program instructions that when executed on or across the one or more processors:
cause, after the commit finalization phase, one or more values indicated in the write set to be written to the respective new versions of individual data items of the write set.

19. The one or more non-transitory computer-accessible storage media as recited in claim 18, wherein a plurality of values indicated in the write set are written at least partly in parallel.

20. The one or more non-transitory computer-accessible storage media as recited in claim 16, wherein the lock-free data management service comprises a plurality of nodes including one or more transaction coordinator nodes, the one or more non-transitory computer-accessible storage media storing further program instructions that when executed on or across the one or more processors:
obtain, at a transaction coordinator node of the lock-free data management service, a commit request for the particular transaction, wherein the multi-phase commit is initiated in response to the commit request, wherein the proposed commit time is assigned by the transaction coordinator node, wherein the proposed commit time is based at least in part on a local clock accessible from the transaction coordinator node, and wherein the local clock accessible from the transaction coordinator node is not synchronized with local clocks accessible from other nodes of the lock-free data management service.

* * * * *